(12) United States Patent
Ueki

(10) Patent No.: US 7,161,889 B2
(45) Date of Patent: Jan. 9, 2007

(54) INFORMATION RECORDING MEDIUM, METHOD AND APPARATUS FOR RECORDING AND REPRODUCING INFORMATION

(75) Inventor: Yasuhiro Ueki, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 171 days.

(21) Appl. No.: 11/006,566

(22) Filed: Dec. 8, 2004

(65) Prior Publication Data

US 2005/0099928 A1    May 12, 2005

Related U.S. Application Data

(62) Division of application No. 10/714,865, filed on Nov. 18, 2003, now Pat. No. 6,847,604, which is a division of application No. 09/614,189, filed on Jul. 11, 2000, now Pat. No. 6,678,236.

(30) Foreign Application Priority Data

| Aug. 24, 1999 | (JP) | ................................. 11-236629 |
| Sep. 9, 1999 | (JP) | ................................. 11-255334 |
| Mar. 24, 2000 | (JP) | ................................. 2000-83606 |

(51) Int. Cl.
   *G11B 20/12*    (2006.01)
   *G11B 7/24*    (2006.01)

(52) U.S. Cl. .............................. 369/59.25; 369/30.01; 369/275.3

(58) Field of Classification Search ............. 369/59.25, 369/275.3, 275.4, 30.01, 30.04, 30.05, 30.07, 369/30.22, 53.21, 53.35, 47.22, 59.23
   See application file for complete search history.

(56) References Cited

U.S. PATENT DOCUMENTS

| 5,892,752 | A | | 4/1999 | Matsuura |
| 5,930,209 | A | * | 7/1999 | Spitzenberger et al. .. 369/53.21 |
| 6,072,759 | A | | 6/2000 | Maeda et al. |
| 6,078,559 | A | * | 6/2000 | Takemura et al. ....... 369/275.3 |
| 6,128,271 | A | | 10/2000 | Ohta |
| 6,310,854 | B1 | | 10/2001 | Sato et al. |
| 6,418,111 | B1 | | 7/2002 | Takemura et al. |
| 6,532,208 | B1 | | 3/2003 | Nakajima |

(Continued)

FOREIGN PATENT DOCUMENTS

EP        0802535        10/1997

(Continued)

OTHER PUBLICATIONS

ECMA: Standardizing Information And Communication Systems: "Standard ECMA-272, $2^{nd}$ edition: 120 mm DVD Rewritable Disk (DVD-RAM)" Standard ECMA-272, XX, XX, No. 272, Jun. 1999, pp. 1-99, XP002186767.

*Primary Examiner*—Thang V. Tran
(74) *Attorney, Agent, or Firm*—Louis Woo

(57) ABSTRACT

An information recording medium includes a lead-in area and a data area for storing contents information. The lead-in area includes a first lead-in information area and a second lead-in information area. The first lead-in information area corresponds to a first playback mode. The second lead-in information area corresponds to a second playback mode different from the first playback mode. The first lead-in information area has a first depth and is designed for storing lead-in information related to the contents information stored in the data area. The second lead-in information area includes pre-pits having a second depth greater than the first depth. The pre-pits represent predetermined information, such as information of copyright protection, related to the contents information stored in the data area.

6 Claims, 10 Drawing Sheets

U.S. PATENT DOCUMENTS

| | | | |
|---|---|---|---|
| 6,535,477 B1 * | 3/2003 | Muramatsu et al. | 369/275.4 |
| 6,618,350 B1 * | 9/2003 | Sasaki et al. | 369/275.4 |
| 6,700,843 B1 * | 3/2004 | Kuroda | 369/53.2 |
| 6,938,162 B1 * | 8/2005 | Nagai et al. | 369/286 |

FOREIGN PATENT DOCUMENTS

| | | |
|---|---|---|
| EP | 0908881 | 4/1999 |
| EP | 0965988 | 12/1999 |

\* cited by examiner

INFORMATION RECORDING MEDIUM, METHOD AND APPARATUS FOR RECORDING AND REPRODUCING INFORMATION

This application is a divisional of U.S. patent application Ser. No. 10/714,865 filed Nov. 18, 2003 now U.S. Pat. No. 6,847,604 which in turn is a divisional of U.S. patent application Ser. No. 09/614,189 filed Jul. 11, 2000 now U.S. Pat. No. 6,678,236, the disclosure of which being incorporated by reference to this application.

BACKGROUND OF THE INVENTION

1. Field of the Invention

This invention relates to an information recording medium.

Also, this invention relates to a method and an apparatus for recording information on a recording medium. In addition, this invention relates to a method and an apparatus for reproducing information from a recording medium.

2. Description of the Related Art

A DVD (digital versatile disc) family contains a DVD-Video and a DVD-RW. Here, DVD-RW is short for DVD-Rewritable.

The DVD-Video is designed for a playback purpose (a reproduction purpose) only. In general, the DVD-Video stores main information, and copyright information corresponding to the main information. For example, the copyright information is designed to prevent the contents of the main information from being illegally copied. According to a CSS (a contents scramble system), the copyright information is recorded on a given area of the disc, that is, an area of the disc which is assigned to information related to copyright protection such as information of a CSS key.

A DVD-Video player operates as follows. First, the player reads out information of a CSS key from a disc. When the information of the CSS key is correct, the player is permitted to reproduce the contents of main information from the disc. Otherwise, the player is inhibited form reproducing the contents of the main information. Thus, the CSS key functions to prevent the contents of the main information from being illegally copied.

It is assumed that a DVD recording system illegally records DVD-Video contents information and corresponding CSS-key information on a disc. In this case, since the correct CSS-key information is present in the disc, a DVD-Video player can reproduce the DVD-Video contents information. Thus, in this case, it is difficult to protect copyright on the DVD-Video contents information.

The DVD family also contains a DVD-R (a DVD-Recordable). Information can be recorded on the DVD-R only once. It is conceivable that before the shipment of a virgin DVD-R from a factory, the disc is physically processed to record a special code signal other than a signal of a CSS key on a given area of the disc which corresponds to a copyright information area of a DVD-Video. In this case, it is difficult to write information of a CSS key over the given area of the DVD-R after the shipment thereof from the factory. It is assumed that a DVD recording system illegally records DVD-Video contents information on such a DVD-R. CSS-key information corresponding to the DVD-Video contents information is absent from the DVD-R since it is difficult to record the CSS-key information on the disc. Accordingly, in this case, a DVD-Video player can not reproduce the DVD-contents information from the disc. Thus, it is possible to protect copyright on the DVD-Video contents information.

The DVD-RW has the feature that information can be repetitively recorded thereon a plurality of times. An explanation is now given of the case where before the shipment of a virgin DVD-RW from a factory, a special code signal other than a signal of a CSS key is recorded on a given area of the disc which corresponds to a copyright information area of a DVD-Video. Even in this case, it is possible for a DVD recording system to illegally record DVD-Video contents information and corresponding CSS-key information on the DVD-RW after the shipment thereof from the factory. Since the correct CSS-key information is present in the disc, a DVD-Video player can reproduce the DVD-Video contents information therefrom. Thus, in this case, it is difficult to protect copyright on the DVD-Video contents information.

Regarding a DVD-RW or a similar rewritable disc storing DVD-contents information permitted to be copied, it is desirable that the DVD-contents information can be reproduced from the disc. Also, in some cases, it is desirable that the DVD-contents information can be copied.

An optical disc conforming to the RTR (real-time recording) standards is incompatible with a DVD-Video. Regarding an RTR disc storing main information and copyright information, it is desirable to control the copying (the recording and the reproduction) of the main information in accordance with the contents of the copyright information.

SUMMARY OF THE INVENTION

It is a first object of this invention to provide an improved information recording medium.

It is a second object of this invention to provide an improved method of recording information on a recording medium.

It is a third object of this invention to provide an improved apparatus for recording information on a recording medium.

It is a fourth object of this invention to provide an improved method of reproducing information from a recording medium.

It is a fifth object of this invention to provide an improved apparatus for reproducing information from a recording medium.

A first aspect of this invention provides an information recording medium comprising a lead-in area and a data area for storing contents information, the lead-in area including a first lead-in information area and a second lead-in information area, the first lead-in information area corresponding to a first playback mode, the second lead-in information area corresponding to a second playback mode different from the first playback mode, the first lead-in information area having a first depth and being for storing lead-in information related to the contents information stored in the data area, the second lead-in information area including pre-pits having a second depth greater than the first depth, the pre-pits representing predetermined information related to the contents information stored in the data area.

A second aspect of this invention provides an information recording medium comprising a lead-in area and a data area for storing contents information, the lead-in area including a first lead-in information area and a second lead-in information area, the first lead-in information area corresponding to a first recording/playback mode, the second lead-in information area corresponding to a second recording/playback mode different from the first recording/playback mode, the first lead-in information area being for storing lead-in information related to the contents information stored in the data area in units of predetermined error correction blocks, the second lead-in information area being for inerasably storing information containing predetermined information related to the contents information stored in the data area, wherein an amount of the information containing the predetermined information exceeds a value corresponding to an upper limit of an ability of the predetermined error correction blocks to correct errors.

A third aspect of this invention is based on the first aspect thereof, and provides an information recording medium wherein the lead-in information contains flag information representing a validity of the lead-in information.

A fourth aspect of this invention is based on the first aspect thereof, and provides an information recording medium wherein the first lead-in information area and the second lead-in information area comprise information-recordable areas made of phase-changeable material, and the predetermined information is reproducible.

A fifth aspect of this invention provides a method of recording lead-in information and contents information on an information recording medium, the information recording medium comprising a lead-in area and a data area for storing contents information, the lead-in area including a first lead-in information area for storing the lead-in information and a second lead-in information area for storing the lead-in information except predetermined information related to the contents information stored in the data area. The method comprises the steps of recording the lead-in information on the first lead-in information area, and recording the contents information on the data area during a first recording mode of operation which corresponds to recording on the first lead-in information area; and recording the lead-in information except the predetermined information on the second lead-in information area, and recording the contents information on the data area during a second recording mode of operation which corresponds to recording on the second lead-in information area.

A sixth aspect of this invention provides an apparatus for recording lead-in information and contents information on an information recording medium, the information recording medium comprising a lead-in area and a data area for storing contents information, the lead-in area including a first lead-in information area for storing the lead-in information and a second lead-in information area for storing the lead-in information except predetermined information related to the contents information stored in the data area. The apparatus comprises first means for deciding which of a first recording mode of operation and a second recording mode of operation is selected, wherein the first recording mode of operation corresponds to recording on the first lead-in information area, and the second recording mode of operation corresponds to recording on the second lead-in information area; second means for recording the lead-in information on the first lead-in information area, and recording the contents information on the data area when the first means decides that the first recording mode of operation is selected; and third means for recording the lead-in information except the predetermined information on the second lead-in information area, and recording the contents information on the data area when the first means decides that the second recording mode of operation is selected.

A seventh aspect of this invention provides a method of reproducing contents information from an information recording medium, the information recording medium comprising a lead-in area and a data area for storing the contents information, the lead-in area including a first lead-in information area and a second lead-in information area. The method comprises the steps of reproducing lead-in information from the first lead-in information area during a first playback mode of operation which corresponds to the first lead-in information area; reproducing lead-in information from the second lead-in information area during a second playback mode of operation which corresponds to the second lead-in information area; and reproducing the contents information from the data area in cases where the lead-in information is reproduced from one of the first lead-in information area and the second lead-in information area.

An eighth aspect of this invention provides an apparatus for reproducing contents information from an information recording medium, the information recording medium comprising a lead-in area and a data area for storing the contents information, the lead-in area including a first lead-in information area and a second lead-in information area. The apparatus comprises first means for scanning the first lead-in information area to reproduce lead-in information from the first lead-in information area during a first playback mode of operation which corresponds to the first lead-in information area; second means for scanning the second lead-in information area to reproduce lead-in information from the second lead-in information area during a second playback mode of operation which corresponds to the second lead-in information area; and third means for reproducing the contents information from the data area in cases where one of the first means and the second means reproduces the lead-in information from one of the first lead-in information area and the second lead-in information area during one of the first playback mode of operation and the second playback mode of operation.

A ninth aspect of this invention is based on the first aspect thereof, and provides an information recording medium wherein the first depth is smaller than $\lambda/(8n)$, and the second depth is in a range of about $\lambda/(4n)$ to about $\lambda/(8n)$, where "$\lambda$" denotes a wavelength of reading laser light and "n" denotes a refractive index of a material for the medium.

A tenth aspect of this invention is based on the second aspect thereof, and provides an information recording medium wherein an information amount of the predetermined error correction blocks is equal to about 32 Kbytes, and the upper limit of an ability of the predetermined error correction blocks to correct errors corresponds to about 2 Kbytes, and wherein the amount of the information containing the predetermined information is equal to about 8 Kbytes or more.

An eleventh aspect of this invention provides an information recording medium comprising a lead-in area and a data area for storing contents information, the lead-in area including a first lead-in information area and a second lead-in information area, the first lead-in information area having a first depth and being for storing first lead-in information related to the contents information stored in the data area, the first lead-in information including information of medium manufacture and information of a contents-information start position, the second lead-in information area including pre-pits having a second depth greater than the first depth, the pre-pits representing predetermined information related to the contents information stored in the data area, the second lead-in information area including an area for storing second lead-in information including the information of medium manufacture and the information of the contents-information start position.

A twelfth aspect of this invention provides an information recording medium comprising a lead-in area and a data area for storing contents information, the lead-in area including a first lead-in information area and a second lead-in information area, the first lead-in information area being for storing first lead-in information related to the contents information stored in the data area in units of predetermined error correction blocks, the first lead-in information including information of medium manufacture and information of a contents-information start position, the second lead-in information area being for inerasably storing information containing predetermined information related to the contents information stored in the data area, wherein an amount of the information containing the predetermined information exceeds a value corresponding to an upper limit of an ability of the predetermined error correction blocks to correct errors, the second lead-in information area including an area for storing second lead-in information including the information of medium manufacture and the information of the contents-information start position.

A thirteenth aspect of this invention is based on the eleventh aspect thereof, and provides an information recording medium wherein each of the first lead-in information and the second lead-in information contains flag information representing a validity of the related lead-in information.

A fourteenth aspect of this invention is based on the eleventh aspect thereof, and provides an information recording medium wherein the first lead-in information area and the second lead-in information area comprise information-recordable areas made of phase-changeable material, and the predetermined information is reproducible but becomes unreadable when new information is recorded again.

A fifteenth aspect of this invention is based on the first aspect thereof, and provides an information recording medium wherein the first lead-in information area corresponds to RTR standards, and the second lead-in information area corresponds to DVD-Video standards.

A sixteenth aspect of this invention is based on the first aspect thereof, and provides an information recording medium wherein the predetermined information comprises information of a CSS key having a given value.

A seventeenth aspect of this invention provides a method of reproducing contents information from an information recording medium, the information recording medium comprising a lead-in area and a data area for storing the contents information, the lead-in area including a first lead-in information area and a second lead-in information area. The method comprises the steps of reading out first lead-in information from the first lead-in information area; deciding whether or not the read-out first lead-in information is valid; reproducing the contents information from the data area in response to the read-out first lead-in information when it is decided that the read-out first lead-in information is valid; deciding whether or not second lead-in information is required to be read out from the second lead-in information area; and reading out the second lead-in information from the second lead-in information area, and reproducing the contents information from the data area in response to the read-out first lead-in information and the read-out second lead-in information in cases where it is decided that the second lead-in information is required to be read out from the second lead-in information area.

An eighteenth aspect of this invention provides a method of reproducing contents information from an information recording medium, the information recording medium comprising a lead-in area and a data area for storing the contents information, the lead-in area including a first lead-in information area and a second lead-in information area. The method comprises the steps of deciding whether first lead-in information is present in or absent from the first lead-in information area; reading out the first lead-in information from the first lead-in information area when it is decided that the first lead-in information is present in the first lead-in information area; deciding whether the read-out first lead-in information is valid or invalid; reproducing the contents information from the data area in response to the read-out first lead-in information when it is decided that the read-out first lead-in information is valid; and reading out second lead-in information from the second lead-in information area, and reproducing the contents information from the data area in response to the read-out second lead-in information in cases where it is decided that the first lead-in information is absent from the first lead-in information area or in cases where it is decided that the read-out first lead-in information is invalid.

A nineteenth aspect of this invention provides an apparatus for reproducing contents information from an information recording medium, the information recording medium comprising a lead-in area and a data area for storing the contents information, the lead-in area including a first lead-in information area and a second lead-in information area. The apparatus comprises first means for reading out first lead-in information from the first lead-in information area; second means for deciding whether or not the read-out first lead-in information is valid; third means for reproducing the contents information from the data area in response to the read-out first lead-in information when the second means decides that the read-out first lead-in information is valid; fourth means for deciding whether or not second lead-in information is required to be read out from the second lead-in information area; and fifth means for reading out the second lead-in information from the second lead-in information area, and reproducing the contents information from the data area in response to the read-out first lead-in information and the read-out second lead-in information in cases where the fourth means decides that the second lead-in information is required to be read out from the second lead-in information area.

A twentieth aspect of this invention provides an apparatus for reproducing contents information from an information recording medium, the information recording medium comprising a lead-in area and a data area for storing the contents information, the lead-in area including a first lead-in information area and a second lead-in information area. The apparatus comprises first means for deciding whether first lead-in information is present in or absent from the first lead-in information area; second means for reading out the first lead-in information from the first lead-in information area when the first means decides that the first lead-in information is present in the first lead-in information area; third means for deciding whether the read-out first lead-in information is valid or invalid; fourth means for reproducing the contents information from the data area in response to the read-out first lead-in information when the third means decides that the read-out first lead-in information is valid; and fifth means for reading out second lead-in information from the second lead-in information area, and reproducing the contents information from the data area in response to the read-out second lead-in information in cases where the first means decides that the first lead-in information is absent from the first lead-in information area or in cases where the third means decides that the read-out first lead-in information is invalid.

A twenty-first aspect of this invention is based on the seventeenth aspect of this invention, and provides a method wherein the information recording medium comprises an information recording medium of the first aspect of this invention.

A twenty-second aspect of this invention is based on the nineteenth aspect thereof, and provides an apparatus wherein the information recording medium comprises an information recording medium of the first aspect of this invention.

A twenty-third aspect of this invention provides a rewritable information-recording optical disc comprising a lead-in area assigned to lead-in information and a data area assigned to contents information, the lead-in area including a first sub-area and a second sub-area, the first sub-area corresponding to first disc standards and including a phase change recording area, the first sub-area being assigned to lead-in information corresponding to the first disc standards, the second sub-area corresponding to second disc standards different from the first disc standards and including pre-pits representative of predetermined information in a predetermined logic state, the predetermined information relating to the contents information to which the data area is assigned, the second sub-area being assigned to lead-in information corresponding to the second disc standards, the data area including a phase change recording area.

A twenty-fourth aspect of this invention is based on the first aspect thereof, and provides an information recording medium wherein the predetermined information comprises information of copyright protection related to the contents information stored in the data area.

A twenty-fifth aspect of this invention is based on the second aspect thereof, and provides an information recording medium wherein the predetermined information comprises information of copyright protection related to the contents information stored in the data area.

A twenty-sixth aspect of this invention is based on the fifth aspect thereof, and provides a method wherein the predetermined information comprises information of copyright protection related to the contents information stored in the data area.

A twenty-seventh aspect of this invention is based on the sixth aspect thereof, and provides an apparatus wherein the predetermined information comprises information of copyright protection related to the contents information stored in the data area.

A twenty-eighth aspect of this invention is based on the eleventh aspect thereof, and provides an information recording medium wherein the predetermined information comprises information of copyright protection related to the contents information stored in the data area.

A twenty-ninth aspect of this invention is based on the twelfth aspect thereof, and provides an information recording medium wherein the predetermined information comprises information of copyright protection related to the contents information stored in the data area.

A thirtieth aspect of this invention provides a rewritable information-recording optical disc comprising a lead-in area assigned to lead-in information and a data area assigned to contents information, the lead-in area including a first sub-area and a second sub-area, the first sub-area corresponding to first disc standards and including a phase change recording area, the first sub-area being assigned to lead-in information corresponding to the first disc standards, the second sub-area corresponding to second disc standards different from the first disc standards and including pre-pits representative of copyright protecting information in a predetermined logic state, the second sub-area being assigned to lead-in information corresponding to the second disc standards, the data area including a phase change recording area.

DESCRIPTION OF THE PREFERRED EMBODIMENTS

First Embodiment

An information recording medium (an information-recording optical disc) in a first embodiment of this invention is one of a DVD-RW (a DVD-Rewritable), a CD-RW (a CD-Rewritable), a DVD+RW (DVD+Rewritable), a DVD of another type, and another high-density large-capacity optical disc. In other words, the information recording medium of the first embodiment of this invention conforms to the DVD-RW standards, the CD-RW standards, the DVD+RW standards, the other DVD standards, or the other optical disc standards. The information recording medium (the information-recording optical disc) has a central hole which is of a circular shape.

Figure 1:
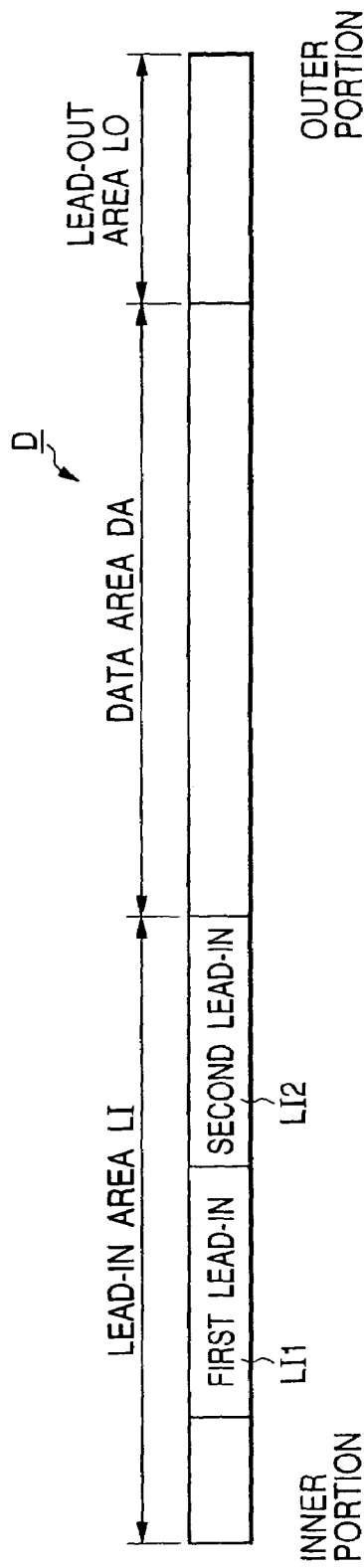
FIG. 1 is a sectional diagram of an information recording medium according to a first embodiment of this invention.

As shown in FIG. 1, the information recording medium (the information-recording optical disc) has a lead-in area LI, a data area DA, and a lead-out area LO. The lead-in area LI, the data area DA, and the lead-out area are successively arranged in that order as viewed along a radially outward direction of the disc. The lead-in area LI includes a first area LI1 and a second area LI2 referred to as a first lead-in area LI1 and a second lead-in area LI2 respectively.

The second lead-in area LI2 extends outward of the first lead-in area LI1.

Lead-in information contains information related to copyright protection. The copyright-protection-related information includes, for example, a signal representing a CSS (contents scramble system) key. The lead-in information is recorded or written on the lead-in area LI of the information recording medium. The lead-in information can be read out from the lead-in area LI. The writing of the lead-in information on the lead-in area LI of the information recording medium, and the read-out of the lead-in information therefrom are designed to satisfy the following conditions ①, ②, and ③.

① Lead-in information which contains a signal of a CSS key is written on the first lead-in area LI1 of the information recording medium when main information (contents information) is recorded on the data area DA thereof. Also, the lead-in information is recorded on the second lead-in area LI2 of the information recording medium in advance. It should be noted that the CSS-key signal may be omitted from the lead-in information. In the case where the lead-in information contains the CSS-key signal, the lead-in information is recorded on the first lead-in area LI1 in a manner such that it can be rewritten or updated. On the other hand, copyright-protection-related information, such as information of a CSS key corresponding to a given value or copy guard information, is recorded on the second lead-in area LI2 in a manner such that it can be neither rewritten nor updated. For example, pre-pits representing the copyright-protection-related information are formed in the second lead-in area LI2 of the information recording medium.

② A recorder-player for the information recording medium can operate in any one of different modes including a first recording mode, a second recording mode, a first playback mode, and a second playback mode. During the first recording mode of operation, if a signal of a CSS key already exists in the first lead-in area LI1, lead-in information containing the signal of the CSS key is recorded on the information recording medium (the first lead-in area LI). During the first playback mode of operation, if a signal of a CSS key already exists in the first lead-in area LI1, lead-in information containing the signal of the CSS key is reproduced from the information recording medium (the first lead-in area LI1). During the second recording mode of operation, if the second lead-in area LI2 has a recordable portion, lead-in information except copyright-protection-related information is recorded on the second lead-in area LI2. During the second playback mode of operation, lead-in information containing copyright-protection-related information is reproduced from the second lead-in area LI2.

③ As previously mentioned, copyright-protection-related information, such as information of a CSS key corresponding to a given value or copy guard information, is recorded on the second lead-in area LI2 in a manner such that it can be neither rewritten nor updated. The copyright-protection-related information is represented by a train of pits, the total number of which is equal to a predetermined value or greater so that the copyright-protection-related information can not be altered by an error correction process.

In the case where the previously-indicated conditions ①, ②, and ③ are satisfied, copyright-protection-related information such as information of a CSS key or copy guard information can be maintained by a compatible player. In addition, even if contents information inhibited by copyright from being copied is illegally recorded on the data area DA of an information recording medium, the contents information is prevented from being reproduced therefrom. On the other hand, after free contents information or contents information permitted by copyright to be copied is recorded on the data area DA of an information recording medium, the contents information can be reproduced therefrom.

In more detail, the first embodiment of this invention has features indicated in the following items (1), (2), (3), and (4).

(1) A DVD-Video is designed for a playback purpose (a reproduction purpose) only. In the DVD-Video, all of contents information and CSS-key information recorded in an area of the disc which corresponds to the second lead-in area LI2 (see FIG. 1) are represented by pits in the disc. The depth of these pits is equal to about $\lambda/(4n)$ where "$\lambda$" denotes a reading laser light wavelength of about 650 nm, and "n" denotes a refractive index of a material (for example, polycarbonate) for the disc. On the other hand, a DVD-RW is a rewritable disc on which information is recorded by a phase change recording method. In the DVD-RW, recorded contents information is stored in a groove (a spiral groove) in the disc. To optimize recording and reproducing performances, the depth of the groove relative to a land is set to about $\lambda/(16n)$ or set in the range of $\lambda/(10n)$ to $\lambda/(18n)$. According to the first embodiment of this invention, copyright-protection-related information such as CSS-key information for a DVD-Video or copy guard information is previously recorded on a DVD-RW. Specifically, the DVD-RW is formed with pre-pits which represent the copyright-protection-related information, and which have a depth in the range of about $\lambda/(4n)$ to about $\lambda/(8n)$. Thus, the depth of the pre-pits in the DVD-RW is close to the depth of the information recording pits in the DVD-Video. Accordingly, a DVD-Video player is allowed to properly reproduce the copyright-protection-related information from the DVD-RW. A disc area in which the pre-pits are located is referred to as a pre-pit area. The pre-pit area extends in the second lead-in area LI2 (see FIG. 1).

(2) The DVD-Video player implements a block-by-block error correction process on a signal read out from a recording disc, for example, a DVD-Video or a DVD-RW. It is now assumed that the copyright-protection-related information recorded on the pre-pit area of the DVD-RW differs from rightful copyright-protection-related information for recorded contents information, and the data amount (the number of bits) of the recorded copyright-protection-related information is within the range of the ability of an ECC (error correction code) block, containing the pre-pit area, to correct errors. In this assumed case, although the player reads out the copyright-protection-related information from the pre-pit area of the DVD-RW, the player recovers the rightful copyright-protection-related information as a result of the error correction process on the read-out signal which corresponds to the ECC block containing the pre-pit area. Thus, the player reproduces the contents information in response to the rightful copyright-protection-related information (the rightful CSS-key information or the rightful copy guard information). Accordingly, the data amount of the copyright-protection-related information represented by the pre-pits in the DVD-RW is set to a value beyond the range of the ability of an ECC block to correct errors. In the case where the rightful copyright-protection-related information fails to be recovered, the player is inhibited from reproducing the contents information from the DVD-RW. Thus, it is possible to prevent the contents information from being illegally copied.

(3) The copyright-protection-related information (the CSS-key information or the copy guard information) same as that recorded on the pre-pit area is stored in a memory such as a ROM in a recorder-player. The copyright-protection-related information same as that recorded on the pre-pit area may be fed to the recorder-player from an external. In the case where the second lead-in area LI2 (see FIG. 1) except the pre-pit area has a phase change recording region, data of an ECC-block are generated from the copyright-protection-related information same as that recorded on the pre-pit area and contents information to be recorded, and the ECC-block data are recorded on the second lead-in area LI2 except the pre-pit area during a recording mode of operation of the recorder-player. Accordingly, during a later playback mode of operation of the recorder-player, the ECC block data can be reproduced as data containing the copyright-protection-related information.

(4) The features indicated in the previous items (1), (2), and (3) provide compatibility of the reproduction of contents information which does not need copyright protection. In some cases, contents information which does not need copyright protection is recorded on an RTR (real-time recording) disc incompatible with a DVD-Video regarding playback. In view of this fact, lead-in information conforming to the RTR standards is recorded on the first lead-in area LI1 (see FIG. 1) of the information recording medium according to the first embodiment of this invention. This design enables the information recording medium to fulfill the requirements of the RTR standards in addition to the DVD standards.

Figure 2:
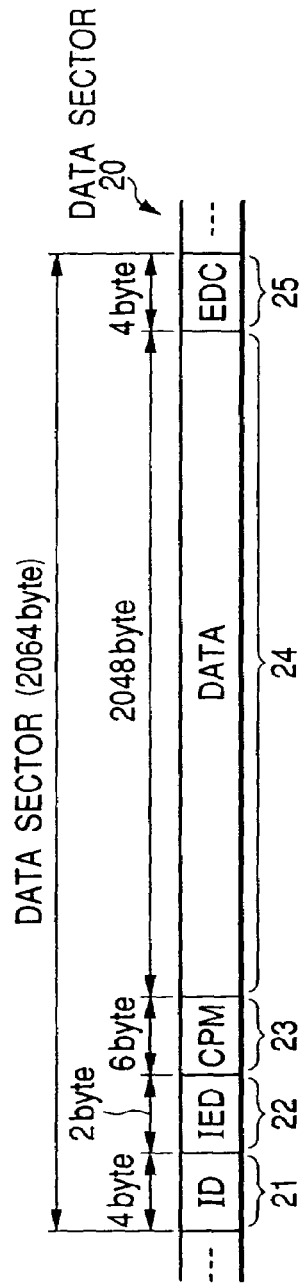
FIG. 2 is a diagram of the format of one data sector.

A signal recording format used in the first embodiment of this invention will be described hereinafter. In general, information to be recorded on a DVD-RW is of a physical structure containing a plurality of data sectors 20 each having 2064 bytes. As shown in FIG. 2, one data sector 20 is composed of ID information 21, an ID-information error correction code (IED) 22, reserved data 23, a data region 24, and an error detection code (EDC) 25 which are sequentially arranged in that order along a direction from the sector head toward the sector end. The ID information 21 indicates the start position of the data sector 20. The ID-information error correction code 22 is designed to correct an error or errors in the ID information 21. For example, the reserved data 23 are used for copyright management information (CPM). The data region 24 stores main data to be recorded. The data region 24 has a size corresponding to 2048 bytes. The error detection code 25 is designed to detect an error or errors in the data region 24. A sequence of data sectors 20 compose information to be recorded.

Figure 3:
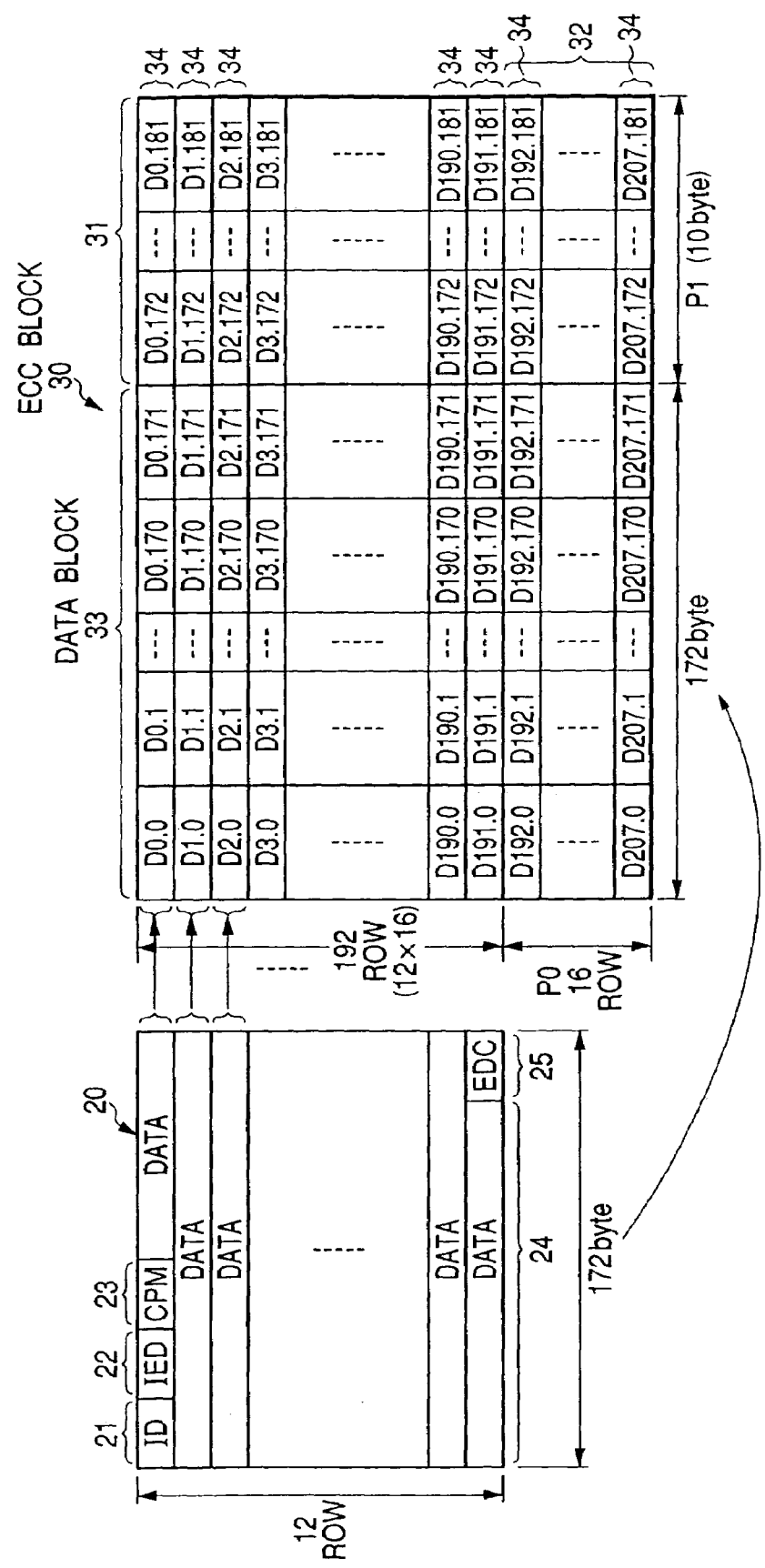
FIG. 3 is a diagram of the format of one ECC block.

The data sectors 20 are combined and changed into ECC blocks. A predetermined number (16) of data sectors 20 are assigned to one ECC block. As shown in FIG. 3, one data sector 20 is divided into 12 equal-size segments each having 172 bytes. These segments are referred to as the data blocks 33. The 12 data blocks 33 are arranged in a vertical direction.

For each of the data blocks 33, a 10-byte ECC inner code signal (a 10-byte PI code signal or a 10-byte parity in code signal) 31 is added to the block end. The addition of the 10-byte ECC inner code signal changes the data block 33 into a correction block 34. Thus, 12 correction blocks 34 are arranged in the vertical direction. A sequence of the above-mentioned steps is reiterated a given number of times which corresponds to 16 data sectors 20. As a result, there are provided 192 rows, that is, 192 correction blocks 34.

Subsequently, the arrangement of the 192 rows formed by the 192 correction blocks 34 is divided into equal-size columns whose horizontal dimension corresponds to 1 byte. Then, 16 ECC outer code signals (PO code signals or parity out code signals) 32 are added to the bottom of each of the columns. It should be noted that ECC outer code signals are added also to the bottoms of columns occupied by the ECC inner code signals 31. The resultant arrangement of the rows and the columns forms one ECC block 30. As understood from the previous description, 16 data sectors 20 are contained in one ECC block 30.

The total amount (the total number of bits) of information in one ECC block 30 is equal to 37856 bytes as expressed by the following equation.

37856 bytes=(172+10) bytes multiplied by (192+16) rows

The total amount (the total number of bits) of data stored in the data regions 24 assigned to one ECC block 30 is equal to 32768 bytes as expressed by the following equation.

32768 bytes=2048 bytes multiplied by 16

In the ECC block 30 of FIG. 3, a 1-byte data piece is denoted by "D#. *". For example, "D1. 0" denotes the 1-byte data piece in the 1-st row and the 0-th column, and "D190. 170" denotes the 1-byte data piece in the 190-th row and the 170-th column. Thus, the ECC inner code signals 31 are placed in the range of the 172-nd column to the 181-st column. On the other hand, the ECC outer code signals 32 are placed in the range of the 192-nd row to the 207-th row.

One correction block 34 is continuously recorded on the DVD-RW. Regarding the ECC block 30 of FIG. 3, correction of errors in the horizontally-extending data sequences is executed in response to the ECC inner code signals 31. On the other hand, correction of errors in the vertically-extending data sequences is executed in response to the ECC outer code signals 32. Thus, the data in the ECC block 30 can be subjected to a double error correction process having an error correction process along the horizontal direction and an error correction process along the vertical direction. Therefore, it is possible to provide a higher ability to correct errors than that of an error correction process used in a prior-art CD.

As previously mentioned, one correction block 34 which is continuously recorded on the DVD-RW has 182-byte data including a 10-byte ECC inner code signal 31 corresponding to one row. In one correction block 34, it is possible to correct errors of 5 bytes or less in response to the ECC inner code signal 31. In one correction block 34, it is difficult to correct errors of 6 bytes or more in response to the ECC inner code signal 31. Such many-byte errors in the horizontal direction correspond to an error of 1 byte as viewed in the vertical direction or the column direction. Therefore, it is possible to correct the many-byte errors in response to ECC outer code signals 32 even when the many-byte errors fully occupy one correction block 34. The maximum vertical dimension of an error group which can be corrected correspond to 8 rows (16 rows in the case of erasure-based correction).

Figure 4:
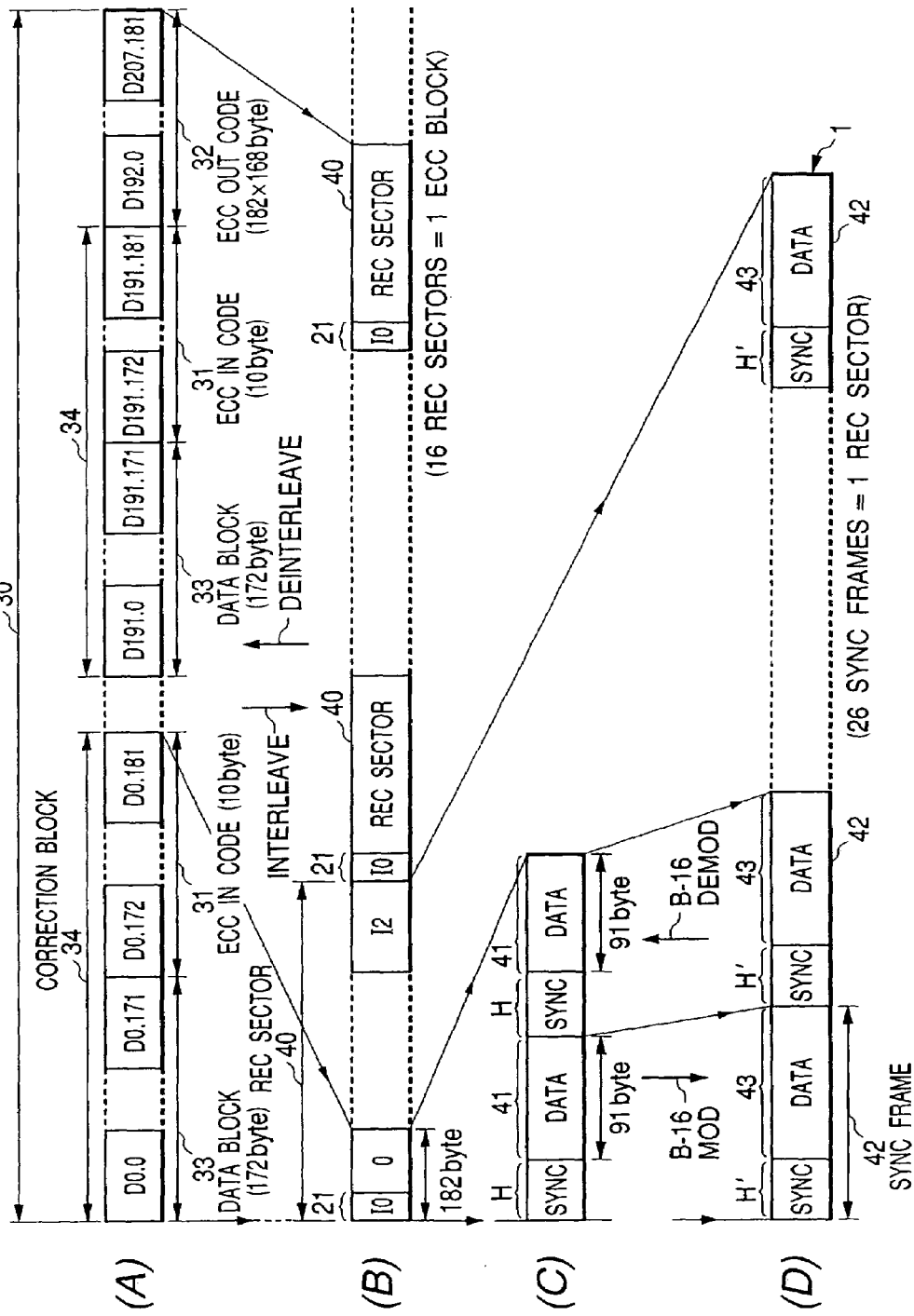
FIG. 4 is a diagram of the format of data recorded on an information recording medium.

With reference to the portion (A) of FIG. 4, correction blocks 34 composing one ECC block 30 are sequentially arranged along a horizontal direction. Data pieces "D#. *" in FIG. 4 correspond to those in FIG. 3. The sequence of correction blocks 34 is interleaved, being divided into 16 recording sectors 40 (see the portion (B) of FIG. 4). Each recording sector 40 has a size corresponding to 2366 bytes (37856 bytes divided by 16). A data sector 20, ECC inner code signals 31, and ECC outer code signals 32 exist in one recording sector 40 on a mixed basis. The head of each recording sector 40 is loaded with ID information 21 (see FIG. 2) in a data sector 20.

As shown in the portions (B) and (C) of FIG. 4, each recording sector 40 is divided into 91-byte data segments 41. Sync signals H are added to the heads of data segments 41, respectively. Then, each sync-added recording sector 40 is subjected to 8–16 modulation so that sync frames 42 are generated from data segments 41 respectively. As shown in the portion (D) of FIG. 4, each sync frame 42 is composed of a sync signal H' and a data segment 43. Each sync frame 42 has a size corresponding to 1456 bytes.

$$\left(\text{equal to 91 bytes multiplied by } 8 \cdot \frac{16}{8}\right).$$

A sequence of sync frames 42 is written on a DVD-RW. In this case, one recording sector 40 corresponds to 26 sync frames 42.

Figure 5:
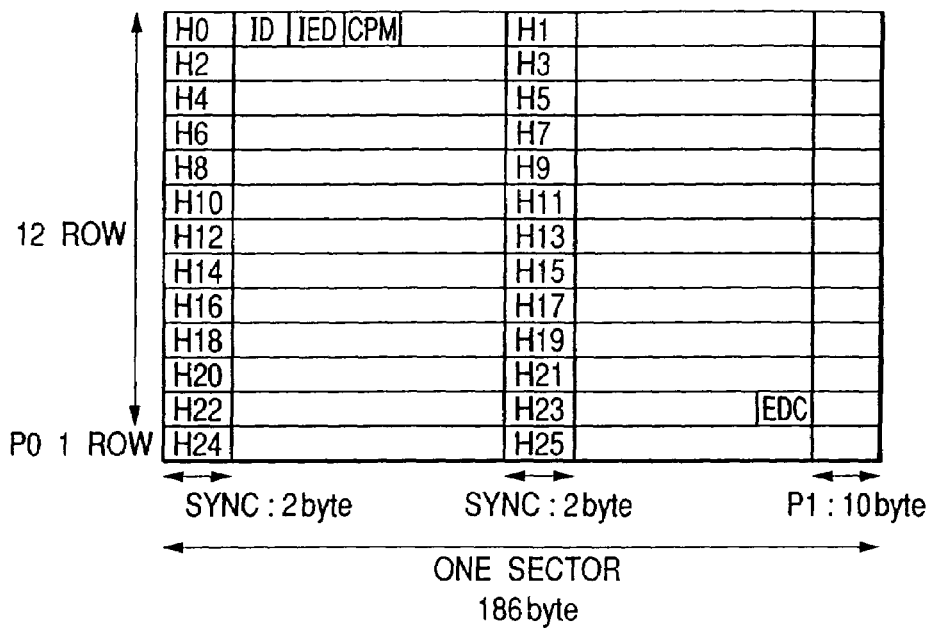
FIG. 5 is a diagram of the physical format of one sector.

Each ECC block 30 is composed of 16 physical sectors. FIG. 5 shows a first physical sector in an ECC sector 30. The physical sector in FIG. 5 has 13 horizontal rows. Each of the first to twelfth horizontal rows has 186 bytes equal to the sum of 172 bytes of data, 10 bytes of a PI code signal, and 4 bytes of sync signals. The thirteenth horizontal row has 186 bytes of PO code signals. The physical sector in FIG. 5 has 26 sync signals H0–H25 each having 2 bytes. Two sync signals are assigned to one horizontal row.

The previously-mentioned physical format is formed, and information containing ECC blocks 30 is recorded on a DVD-RW. During the playback of an after-recording DVD-RW, a signal is read out from the disc and the read-out signal is subjected to 8–16 demodulation and deinterleave so that the original ECC blocks 30 are reproduced. In this case, it is possible to minimize a damaged data block size. Furthermore, the previously-mentioned double error correction process enables the original information to be accurately reproduced. Copy guard information (copyright-protection-related information or CSS-key information) is recorded on the second lead-in area LI2 (see FIG. 1) of the disc as data in a portion of an ECC block 30.

Figure 6:
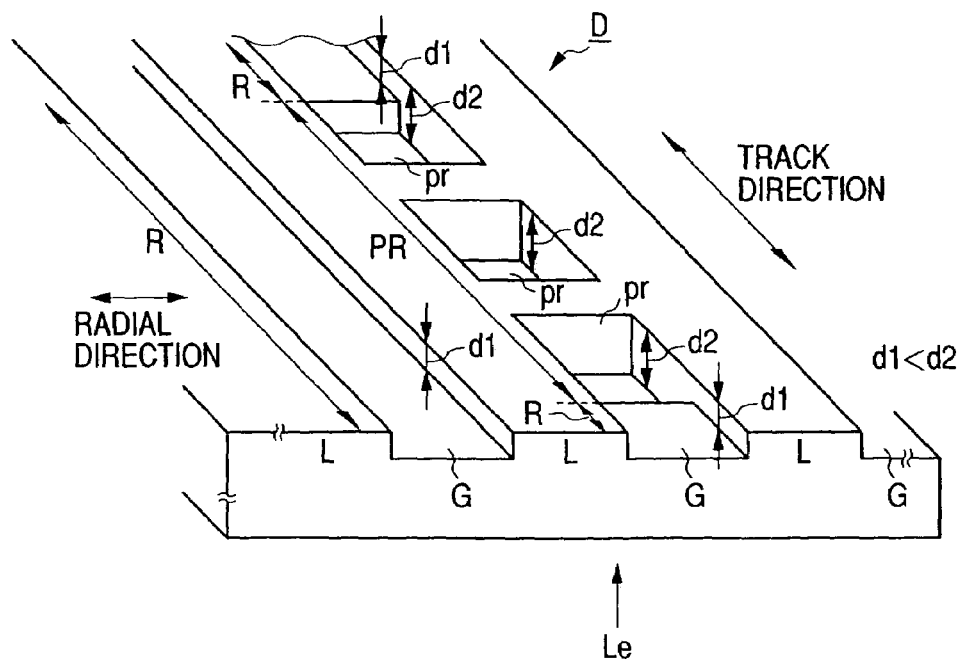
FIG. 6 is a perspective view of a portion of the information recording medium in the first embodiment of this invention.

With reference to FIGS. 1 and 6, an information recording medium (an information-recording optical disc) "D" in the first embodiment of this invention has a lead-in area LI and a data area DA. The data area DA extends outward of the lead-in area LI. The lead-in area LI includes a first area LI1 and a second area LI2 referred to as a first lead-in area LI1 and a second lead-in area LI2 respectively. The second lead-in area LI2 extends outward of the first lead-in area LI1. The first lead-in area LI1 corresponds to a first recording and playback mode of apparatus operation (for example, an RTR playback mode of operation, that is, playback by an RTR player). The second lead-in area LI2 corresponds to a second recording and playback mode of apparatus operation (for example, a DVD compatible playback mode of operation, that is, playback by a DVD-Video player). Contents information such as audio contents information or audio visual contents information is recorded on the data area DA.

The first lead-in area LI1 is formed with a groove (a spiral groove) "G" which has a first predetermined depth d1 (see FIG. 6) relative to a land "L", and which stores, on a phase change recording basis, lead-in information corresponding to the contents information recorded on the data area DA. The lead-in information on the first lead-in area LI1 contains, for example, information of the manufacture of the disc and information of a contents start position. In FIG. 6, the reference character "Le" denotes the direction of an information-recording laser beam or an information-reading laser beam applied to the information recording medium "D". The second lead-in area LI2 includes a pre-pit area PR formed with pre-pits "pr" which have a second predetermined depth d2 (see FIG. 6) relative to the land "L", and which represent copyright-protection-related information and also lead-in information. The second predetermined depth d2 is greater than the first predetermined depth d1. The lead-in information on the second lead-in area LI2 corresponds to the contents information recorded on the data area DA, and contains, for example, information of the manufacture of the disc and information of the contents start position. The copyright-protection-related information on the second lead-in area LI2 concerns the contents information recorded on the data area DA.

The lead-in information on the first lead-in area LI1 corresponds to the contents information which is recorded on the data area DA on an ECC-block-by-ECC-block basis. As previously mentioned, the lead-in information on the first lead-in area LI1 contains, for example, information of the manufacture of the disc and information of a contents start position.

The recording of the copyright-protection-related information on the second lead-in area LI2 is designed to prevent the copyright-protection-related information from being erased or altered during a later overwrite process. In the case where the upper limit of the ability of one ECC block to correct errors corresponds to an information amount of "n" bytes, the amount of the copyright-protection-related information on the second lead-in area LI2 is set greater than "n" bytes. In other words, the amount of the copyright-protection-related information on the second lead-in area LI2 is set beyond the upper limit of the ability of one ECC block to correct errors.

The information recording medium (the information-recording optical disc) "D" in the first embodiment of this invention features that the lead-in information on the first lead-in area LI1 or the second lead-in area LI2 contains flag information indicating the validity of the lead-in information. The flag information has category-indicating information such as standards-related information and version information (media-type information).

In addition, the information recording medium (the information-recording optical disc) "D" in the first embodiment of this invention has the following features. Information is recorded on the medium by a phase change recording method. The copyright-protection-related information can be read out from the second lead-in area LI2.

Figure 7:
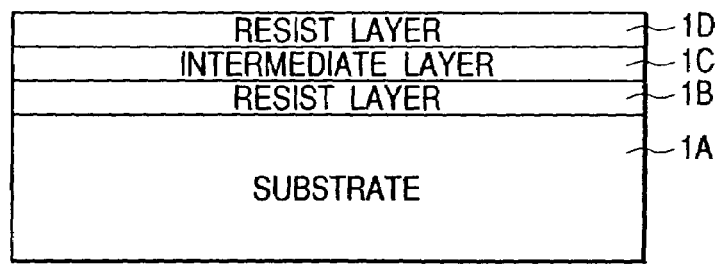
FIG. 7 is a sectional diagram of a laminate of layers from which a master disc is formed.

The information-recording optical disc (the information recording medium) "D" in the first embodiment of this invention is fabricated as follows. With reference to FIG. 7, a second resist layer 1B, an intermediate layer 1C, and a first resist layer 1D are sequentially formed on a glass substrate 1A as a laminate. The sum of the thickness of the intermediate layer 1C and the thickness of the first resist layer 1D is set equal to the depth d1 of the groove "G" in phase change recording areas "R" of the recording medium "D" (see FIG. 6). The sum of the thickness of the second resist layer 1B, the thickness of the intermediate layer 1C, and the thickness of the first resist layer 1D is set equal to the depth d2 of pre-pits "pr" in the pre-pit area PR of the recording medium "D" (see FIG. 6).

A light exposure process (a laser recording process) is performed on the laminate. Specifically, laser light having a first predetermined intensity is applied to the first resist layer 1D from above. The first predetermined intensity is chosen so that the first resist layer 1D and the intermediate layer 1C undergo light exposure and hence the shapes of recording areas "R" are formed on the glass substrate 1A. In addition, laser light having a second predetermined intensity is applied to the first resist layer 1D from above. The second predetermined intensity is set greater than the first predetermined intensity so that the first resist layer 1D, the intermediate layer 1C, and the second resist layer 1B undergo light exposure and hence a pre-pit area PR is formed on the glass substrate 1A.

Figure 8:
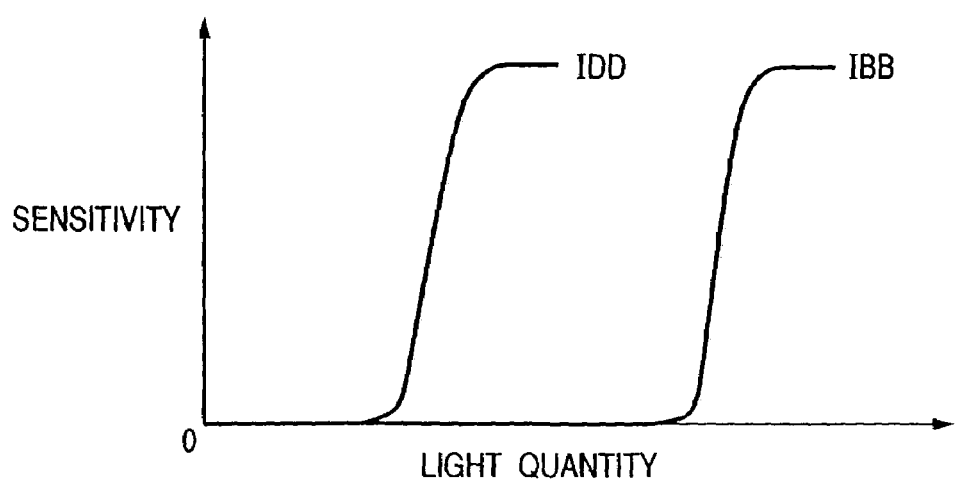
FIG. 8 is a diagram of light quantity-sensitivity characteristics of resist layers in FIG. 7.
Figure 9:
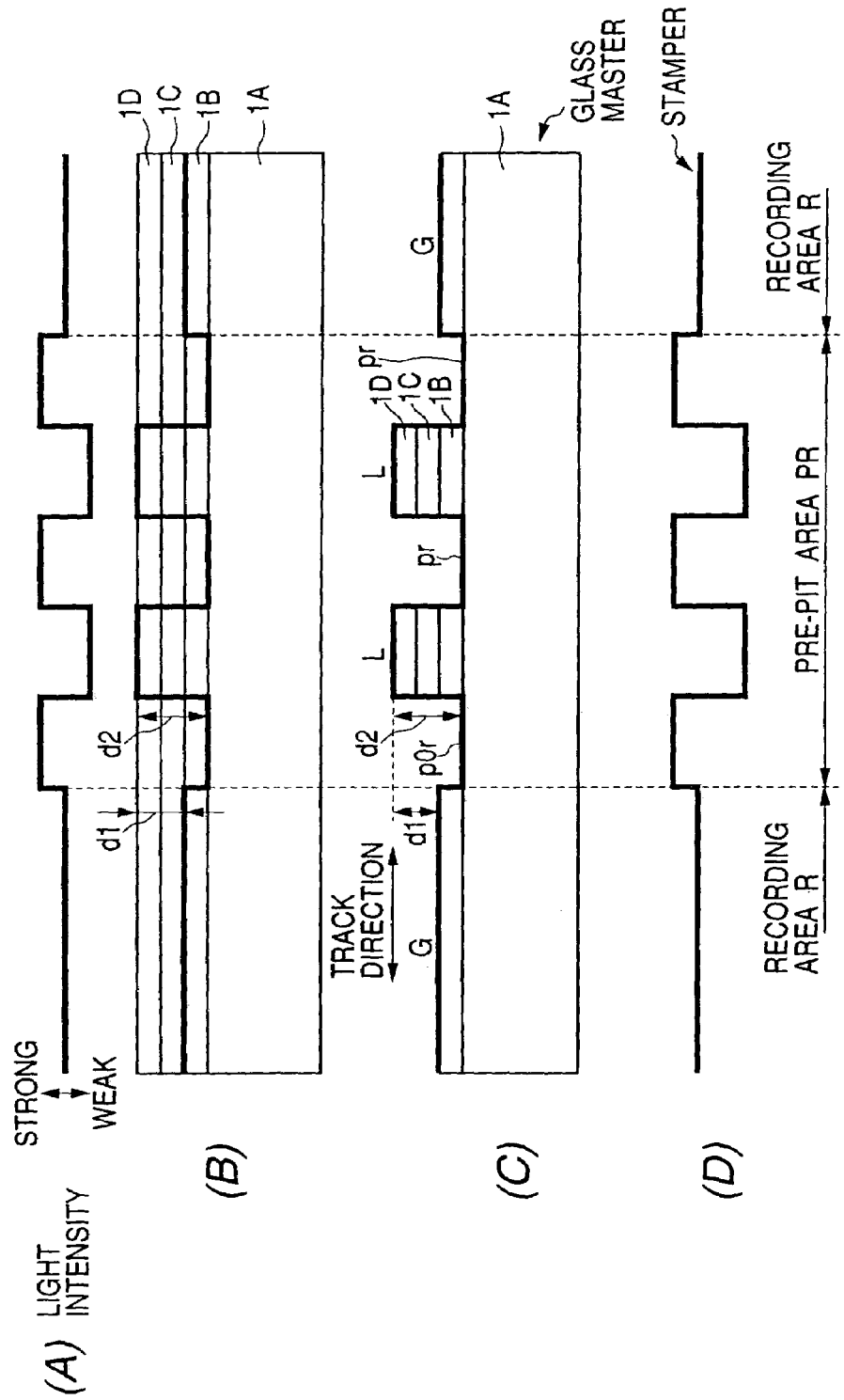
FIG. 9 is a view including a diagram of variations in the intensity of applied light, and sectional diagrams of laminates and a stamper which occur during the fabrication of a master disc.

In more detail, the first resist layer 1D and the second resist layer 1B are made of commercially available material such as "THMLIP3100" produced by Tokyo Ohka Kogyo Co., Ltd. The intermediate layer 1C extends between the first resist layer 1D and the second resist layer 1B, and separates them from each other. The intermediate layer 1C is a film of photosensitive material such as polyvinyl alcohol which is formed by spin coat. As previously mentioned, the second resist layer 1B, the intermediate layer 1C, and the first resist layer 1D are sequentially formed on the glass substrate 1A as a laminate. According to light quantity-sensitivity characteristics 1DD in FIG. 8, the first resist layer 1D is designed to react to a low light quantity (a low light intensity) of recording krypton laser light having a wavelength of 351 nm. According to light quantity-sensitivity characteristics 1BB in FIG. 8, the second resist layer 1B is designed to react to a high light quantity (a high light intensity) of the recording krypton laser light. As shown in FIG. 9, during the laser recording process, the intensity of the recording krypton laser light is changed among a predetermined high level, a predetermined normal level (a predetermined intermediate level), and a predetermined low level to form a groove (or grooves) "G", pre-pits "pr", and a land "L". The pre-pits "pr", and land portions "L" therebetween compose a pre-pit area PR. During the light exposure to form the pre-pit area PR, the change of the intensity of the recording krypton laser light is controlled in response to copyright-protection-related information. Thus, the copyright-protection-related information is recorded on the pre-pit area PR. The length of the pre-pit area PR is set to a predetermined value.

The resultant laminate is subjected to development. After the development, the layers on the glass substrate 1A have shapes such as shown in the portion (C) of FIG. 9. Subsequently, an electrically conductive film such as a nickel film is formed on exposed upper and side surfaces of the first resist layer 1D, the intermediate layer 1C, the second resist layer 1B, and the glass substrate 1A by electroless plating. A film having a thickness of, for example, about 250 µm is deposited on the electrically conductive film by electroplating to form a stamper (see the portion (D) of FIG. 9).

The stamper is attached to a die. Resin such as polycarbonate is shaped into a disc base by an injection molding process using the die with the stamper. A phase change recording film is formed on the disc base by a sputtering process. A protective film is formed on the phase change recording film. The disc base with the recording film and the protective film is initialized so that a virgin information-recording optical disc is completed. The virgin information-recording optical disc has areas including a first lead-in area LI1, a second lead-in area LI2, and a data area DA (see FIG. 1). The data area DA and the first lead-in area LI1 has grooves (spiral grooves) "G" whose depth is equal to about $\lambda/(16n)$. The data area DA and the first lead-in area LI1 are phase change recording areas or information recordable areas. On the other hand, the second lead-in area LI2 contains a pre-pit area PR having pre-pits "pr" whose depth is in the range of about $\lambda/(4n)$ to about $\lambda/(8n)$. The pre-pits "pr" represent the copyright-protection-related information on an unalterable basis or an inerasable basis.

In the information-recording optical disc, the length of the pre-pit area PR is equal to a predetermined value corresponding to more than the upper limit of the ability of an ECC block to correct errors, that is, corresponding to more than 16 rows (or 8 rows) in an ECC block. As previously mentioned, one sector has 13 rows (see FIG. 5). Thus, the length of the pre-pit area PR is equal to a predetermined value corresponding to two sectors or more. Preferably, the length of the pre-pit area PR is equal to a value corresponding to four sectors. Accordingly, in the case where the copyright-protection-related information has not been successfully read out from the pre-pit area PR during playback, the copyright-protection-related information can not be recovered by the error correction process on an ECC block containing the pre-pit area PR. The absence of the recovered copyright-protection-related information prevents related contents information from being illegally copied since the reproduction of the contents information requires the recovered copyright-protection-related information.

The copyright-protection-related information is, for example, information of a CSS key corresponding to a given value (that is, a CSS key in a given logic state). An example of the CSS-key information is in an all-0 state. Preferably, the CSS-key information is in one of given logic states never assigned to normal contents information. It is assumed that the information-recording optical disc stores given CSS-key information in its pre-pit area PR, and contents information scrambled according to a CSS is illegally recorded on the data area DA of the optical disc. Usually, CSS-key information corresponding to the illegally-recorded contents information is different from the given CSS-key information so that the contents information can not be descrambled during playback. On the other hand, after unscrambled contents information is recorded on the data area DA of the information-recording optical disc, the contents information can be reproduced from the optical disc.

It is assumed that contents information and corresponding CSS-key information are illegally copied and overwritten onto the data area DA and the pre-pit area PR of the information-recording optical disc respectively by a phase change recording method. The pre-pits "pr" in the pre-pit area PR cause errors in the phase-change-recorded CSS-key information (the illegally-copied CSS-key information) on the pre-pit area PR during playback. Thus, for the illegally-copied contents information on the optical disc, the pre-pit area PR stores errors instead of the correct CSS-key information. Since the length of the pre-pit area PR corresponds to more than the upper limit of the ability of an ECC block to correct errors, the accurate CSS-key information for the illegally-copied contents information can not be recovered by the error correction process. Therefore, it is difficult to reproduce the illegally-copied contents information from the optical disc.

The CSS-key information on the pre-pit area PR of the information-recording optical disc is data resulting from modulation according to the DVD-Video standards. The CSS-key data have a synchronized phase relation with an LPP address. Preferably, the depth of pre-pits "pr" in the pre-pit area PR is chosen to optimize an RF reproduced signal and a servo signal (for example, a tracking error signal) during playback by a DVD-Video apparatus. Preferably, the depth of pre-pits "pr" in the pre-pit area PR is chosen to optimize a servo signal (for example, a tracking error signal) during recording.

Second Embodiment

A second embodiment of this invention is directed to an apparatus for recording and reproducing lead-in information and contents information on and from an optical disc of the physical format in the first embodiment of this invention. The apparatus is also referred to as the recording and reproducing apparatus.

With reference back to FIG. 1, the optical disc has a lead-in area LI and a data area DA. The lead-in area LI extends inward of the data area DA. The lead-in area LI includes a first area LI1 and a second area LI2 assigned to lead-in information containing information of the manufacture of the disc, information of a contents start position, and copyright-protection-related information (CSS-key information or copy guard information). The first area LI1 and the second area LI2 are referred to as the first lead-in area LI1 and the second lead-in area LI2 respectively. The second lead-in area LI2 extends outward of the first lead-in area LI1. For example, each of the first lead-in area LI1 and the second lead-in area LI2 is composed of 192 ECC blocks. The lead-in information also contains flag information indicating the validity of the lead-in information. The first lead-in area LI1 forms a recording area "R" having a phase change recording layer. The second lead-in area LI2 includes a pre-pit area PR storing copyright-protection-related information (CSS-key information or copy guard information). The second lead-in area LI2 except the pre-pit area PR forms a recording area (or recording areas) "R" having a phase change recording layer. Data of "0" are recorded on the lead-in area LI except the first lead-in area LI1 and the second lead-in area LI2.

Preferably, the optical disc is a DVD-RW. The DVD-RW has a spiral recording track. The DVD-RW has address pre-pits (land-pre-pits) in addition to pre-pits "pr" in the pre-pit area PR. The address pre-pits are formed in a land extending along the recording track. The address pre-pits represent information of sector addresses on the disc. At an initial stage of a recording mode of operation of the apparatus, the address information is reproduced from the address pre-pits in the DVD-RW. During a later stage of the recording mode of operation, recording positions on the DVD-RW are decided in response to the address information, and lead-in information and contents information are recorded on the decided recording positions of the DVD-RW.

Figure 10:
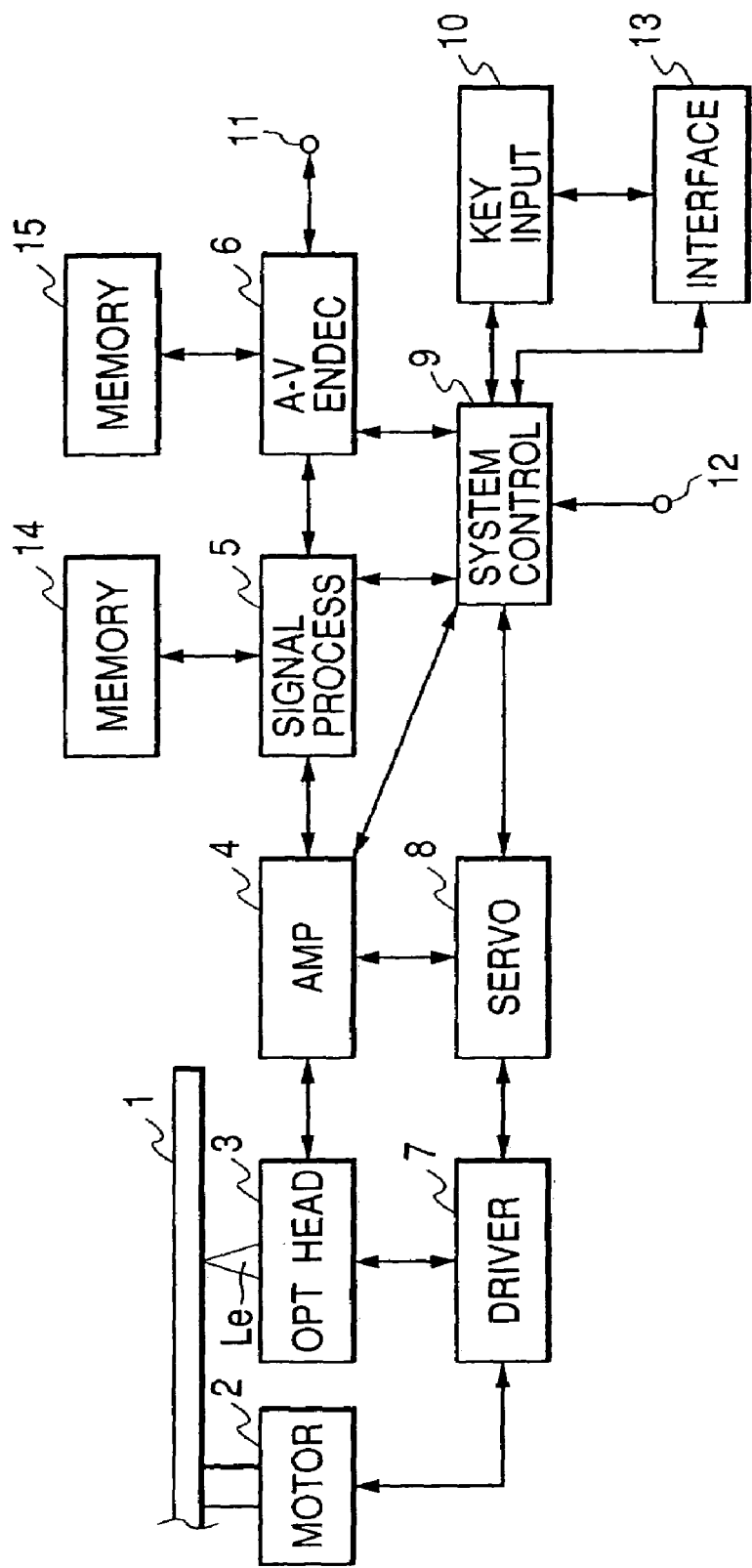
FIG. 10 is a block diagram of a recording and reproducing apparatus according to a second embodiment of this invention.

With reference to FIG. 10, the recording and reproducing apparatus includes a spindle motor 2, an optical head 3, an amplifier unit 4, a signal processor 5, an audio-video encoding and decoding unit 6, a driver 7, a servo unit 8, a system controller 9, a key input unit 10, an input/output terminal 11, an input terminal 12, an interface 13, a track buffer memory 14, and a memory 15.

The spindle motor 2 rotates an optical disc 1. The optical head 3 writes and reads information on and from the optical disc 1. The spindle motor 2 is connected to the driver 7. The optical head 3 is connected to the amplifier unit 4 and the driver 7. The amplifier unit 4 is connected to the signal processor 5 and the servo unit 8. The driver 7 is connected to the servo unit 8. The signal processor 5 is connected to the audio-video encoding and decoding unit 6 and the track buffer memory 14. The audio-video encoding and decoding unit 6 is connected to the memory 15 and the input/output terminal 11. The system controller 9 is connected to the amplifier unit 4, the signal processor 5, the audio-video encoding and decoding unit 6, the servo unit 8, the key input unit 10, the input terminal 12, and the interface 13.

The optical disc 1 is of a rewritable type. The optical disc 1 is made of phase changeable material. The optical disc 1 is, for example, a DVD-RW. The DVD-RW has a spiral track being a sequence of sectors which extends along a spiral. During the recording of information or the reproduction of information, the DVD-RW is rotated at a constant linear velocity (CLV). In the DVD-RW, 16 successive sectors compose one ECC block. The optical disc 1 is coupled with the spindle motor 2 by a chucking mechanism (not shown).

The spindle motor 2 is driven and controlled by the driver 7. The spindle motor 2 rotates the optical disc 1 chucked thereto. The spindle motor 2 is provided with an FG generator and a rotational position sensor (an angular position sensor). The rotational position sensor includes, for example, a Hall element. The FG generator outputs an FG signal to the driver 7. The Hall element outputs a rotational position signal to the driver 7. The FG signal and the rotational position signal are fed back to the servo unit 8 via the driver 7 as rotation servo signals.

The optical head 3 includes a semiconductor laser, a collimator lens, and an objective lens. The semiconductor laser acts as a source for emitting a light beam (a laser beam) Le. The emitted laser beam Le is focused into a laser spot on a track of the optical disc 1 by the collimator lens and the objective lens. The optical head 3 includes a 2-axis actuator for driving the objective lens to implement focusing and tracking of the laser spot with respect to the optical disc 1. The semiconductor laser is driven by a drive circuit in the optical head 3 or the driver 7. The 2-axis actuator is driven by the driver 7.

The key input unit 10 includes a plurality of keys which can be operated by a user. The key input unit 10 generates command signals in accordance with its operation by the user. The command signals are transmitted from the key input unit 10 to the system controller 9. The command signals include a command signal for starting a recording mode of operation of the apparatus, a command signal for starting a playback mode of operation of the apparatus, a command signal for stopping the recording mode of operation of the apparatus, and a command signal for stopping the playback mode of operation of the apparatus. The key input unit 10 generates control data in accordance with its operation by the user. The control data are transmitted from the key input unit 10 to the system controller 9.

The interface 13 is designed for data communications with an external apparatus such as a computer. The interface 13 is of an ATAPI (advanced technology attachment packet interface) type.

The system controller 9 includes, for example, a microcomputer or a similar device which operates in accordance with a program stored in its internal ROM. The system controller 9 controls the amplifier unit 4, the signal processor 5, the audio-video encoding and decoding unit 6, and the servo unit 8 in response to the command signals fed from the key input unit 10. The system controller 9 implements data communications with an external apparatus via the interface 13.

Control data can be fed to the system controller 9 via the input terminal 12. The control data fed to the system controller 9 via the input terminal 12, and the control data fed to the system controller 9 from the key input unit 10 include a signal for adjusting the resolution of pictures represented by contents information to be recorded, a signal for separating quickly-moving scenes such as car racing scenes represented by contents information, and a signal for giving priority to a recording time. The system controller 9 changes an actual recording time in accordance with the control data. The system controller 9 enables the setting of the actual recording time to be selected by the user.

When the apparatus is required to start to operate in the playback mode, the key input unit 10 is actuated to generate the playback start command signal. The playback start command signal is transmitted from the key input unit 10 to the system controller 9. The system controller 9 controls the amplifier unit 4 and the servo unit 8 in response to the playback start command signal, thereby starting the playback mode of operation of the apparatus. The control of the servo unit 8 includes steps of controlling the driver 7. Firstly, the system controller 9 starts rotation of the optical disc 1 and application of a laser spot thereon through the control of the driver 7. The optical head 3 is controlled by the driver 7, thereby reading out address information from land pre-pits (address pre-pits) in a track on the optical disc 1. The read-out address information is transmitted from the optical head 3 to the system controller 9 via the amplifier unit 4. The system controller 9 finds or decides a target sector (a target track portion) to be played back by referring to the address information. The system controller 9 controls the optical head 3 via the servo unit 8 and the driver 7, thereby moving the laser spot to the target sector on the optical disc 1. When the movement of the laser spot to the target sector is completed, the system controller 9 operates to start the reproduction of a signal from the target sector on the optical disc 1. In this way, the playback mode of operation of the apparatus is started. During the playback mode of operation of the apparatus, the target sector is changed from one to another.

During the playback mode of operation of the apparatus, the optical head 3 scans the optical disc 1 and generates an RF signal containing information read out therefrom. The optical head 3 outputs the RF signal to the amplifier unit 4. The amplifier unit 4 enlarges the RF signal. In addition, the amplifier unit 4 generates a main reproduced signal, and tracking and focusing servo signals (tracking error and focusing error signals) from the enlarged RF signal. The amplifier unit 4 includes an equalizer for optimizing the frequency aspect of the main reproduced signal. Also, the amplifier unit 4 includes a PLL (phase locked loop) circuit for extracting a bit clock signal from the equalized main reproduced signal, and for generating a speed servo signal from the equalized main reproduced signal. Furthermore, the amplifier unit 4 includes a jitter generator for comparing the time bases of the bit clock signal and the equalized main reproduced signal, and for detecting jitter components from the results of the time-base comparison. A signal of the detected jitter components is transmitted from the amplifier unit 4 to the system controller 9. The tracking and focusing servo signals and the speed servo signal are transmitted from the amplifier unit 4 to the servo unit 8. The equalized main reproduced signal is transmitted from the amplifier unit 4 to the signal processor 5.

The servo unit 8 receives the speed servo signal and the tracking and focusing servo signals from the amplifier unit 4. The servo unit 8 receives the rotation servo signals from the spindle motor 2 via the driver 7. In response to these servo signals, the servo unit 8 implements corresponding servo control processes.

Specifically, the servo unit 8 generates a rotation control signal on the basis of the speed servo signal and the rotation servo signals. The rotation control signal is transmitted from the servo unit 8 to the spindle motor 2 via the driver 7. The spindle motor 2 rotates at a speed depending on the rotation control signal. The rotation control signal is designed to rotate the optical disc 1 at a given constant linear velocity. The recording and reproduction of information on and from the optical disc 1 are implemented at a desired data transmission rate higher than a maximum data transmission rate which occurs in data compression and expansion executed in the apparatus. Accordingly, the rotation control signal is designed so that the given constant linear velocity will allow the attainment of the desired data transmission rate in the recording and reproduction of information on and from the optical disc 1.

In addition, the servo unit 8 generates servo control signals on the basis of the focusing and tracking servo signals. The servo control signals are transmitted from the servo unit 8 to the 2-axis actuator in the optical head 3 via the driver 7. The 2-axis actuator controls the laser spot on the optical disc 1 in response to the servo control signals, and thereby implements focusing and tracking of the laser spot with respect to the optical disc 1.

During the playback mode of operation of the apparatus, the signal processor 5 receives the main reproduced signal from the amplifier unit 4. The signal processor 5 converts the main reproduced signal into a corresponding reproduced digital signal. The signal processor 5 detects a sync signal from the reproduced digital signal. The signal processor 5 decodes an EFM+ signal (an 8–16 modulation signal) of the reproduced digital signal into NRZ data, that is, non-return-to-zero data. The signal processor 5 subjects the NRZ data to an error correction process, thereby generating address data and reproduced data. The address data represent the address of a currently-accessed sector on the optical disc 1. The sync signal and the address data are fed from the signal processor 5 to the system controller 9.

In the case where the reproduced data are MPEG data resulting from compression at a variable transmission rate, the signal processor 5 temporarily stores the reproduced data in the track buffer memory 14. In addition, writing and reading the data into and from the track buffer memory 14 are controlled to absorb a time-domain change in the transmission rate of the reproduced data. The track buffer memory 14 includes, for example, a D-RAM having a capacity of 64 Mbytes. The track buffer memory 14 means a buffer memory in which compressed data are temporarily stored. The track buffer memory 14 contains a buffer memory for absorbing a time-domain change in the transmission rate of DVD data, and a buffer memory used in encoding and decoding MPEG data. For example, the system controller 9 implements the control of the data write and data read-out into and from the track buffer memory 14 via the signal processor 5. In addition, the system controller 9 implements management of a used storage area and a used storage size in the track buffer memory 14 via the signal processor 5. The signal processor 5 receives the read-out data (the reproduced data) from the track buffer memory 14. The signal processor 5 outputs the reproduced data to the audio-video encoding and decoding unit 6.

In the case where the reproduced data fed from the track buffer memory 14 via the signal processor 5 are compressed MPEG2 data in which audio data and video data are multiplexed, the audio-video encoding and decoding unit 6 separates the reproduced data into compressed audio data and compressed video data. The audio-video encoding and decoding unit 6 expands and decodes the compressed audio data into non-compressed audio data. In addition, the audio-vide encoding and decoding unit 6 expands and decodes the compressed video data into non-compressed video, data. During the expansively decoding process, the audio-video encoding and decoding unit 6 temporarily stores data in the memory 15. The memory 15 includes, for example, a D-RAM having a capacity of 64 Mbytes. The audio-video encoding and decoding unit 6 converts the non-compressed audio data into a corresponding analog audio signal through digital-to-analog conversion. Also, the audio-video encoding and decoding unit 6 converts the non-compressed video data into a corresponding analog video signal through digital-to-analog conversion. It should be noted that the conversion of the non-compressed audio and video data into the analog audio and video signals may be implemented by digital-to-analog converters provided externally of the audio-video encoding and decoding unit 6. The audio-video encoding and decoding unit 6 applies the analog audio signal and the analog video signal to the input/output terminal 11. The analog audio signal and the analog video signal are transmitted to an external via the input/output terminal 11. The analog video signal transmitted from the input/output terminal 11 is processed by an NTSC encoder before the processing-resultant video signal is indicated on a monitor device (a display). The analog audio signal transmitted from the input/output terminal 11 is fed to a loudspeaker, being converted thereby into a corresponding sound.

The data rate of the expansively decoding process by the audio-video encoding and decoding unit 6, that is, the data transmission rate in the expansively decoding process, is equalized to an expansion data rate which is set in accordance with the type of the related recording mode of operation of the apparatus. Specifically, the audio-video encoding and decoding unit 6 can implement the expansively decoding process at a expansion data rate which can be changed among plural different expansion data rates. The audio-video encoding and decoding unit 6 selects one from among the plural different expansion data rates as a desired expansion data rate in accordance with the type of the related recording mode of operation of the apparatus. The audio-video encoding and decoding unit 6 executes the expansively encoding process at the desired expansion data rate. Information of the type of the recording mode of operation of the apparatus is recorded on the optical disc 1 as control data. During the playback of the optical disc 1, the control data are read out therefrom before being transmitted to the system controller 9. The system controller 9 sets the expansion data rate in the audio-video encoding and decoding unit 6 in accordance with the control data.

When the apparatus is required to start to operate in the recording mode, the key input unit 10 is actuated to generate the recording start command signal. The recording start command signal is transmitted from the key input unit 10 to the system controller 9. The system controller 9 controls the amplifier unit 4 and the servo unit 8 in response to the recording start command signal, thereby starting the recording mode of operation of the apparatus. The control of the servo unit 8 includes steps of controlling the driver 7. Firstly, the system controller 9 starts rotation of the optical disc 1 and application of a laser spot thereon through the control of the driver 7. The optical head 3 is controlled by the driver 7, thereby reading out address information from land pre-pits (address pre-pits) in a track on the optical disc 1. The read-out address information is transmitted from the optical head 3 to the system controller 9 via the amplifier unit 4. The system controller 9 finds or decides a target sector (a target track portion), on which a signal is to be recorded, by referring to the address information. The system controller 9 controls the optical head 3 via the servo unit 8 and the driver 7, thereby moving the laser spot to the target sector on the optical disc 1. During the recording mode of operation of the apparatus, the target sector is changed from one to another.

During the recording mode of operation of the apparatus, an audio signal and a video signal to be recorded are fed via the input/output terminal 11 to the audio-video encoding and decoding unit 6. The audio-video encoding and decoding unit 6 converts the audio signal into corresponding audio data through analog-to-digital conversion. In addition, the audio-video encoding and decoding unit 6 converts the video signal into corresponding video data through analog-to-digital conversion. It should be noted that the conversion of the audio and video signals into the audio and video data may be implemented by analog-to-digital converters provided externally of the audio-video encoding and decoding unit 6. The audio-video encoding and decoding unit 6 compressively encodes the audio data and the video data into MPEG2 audio data and MPEG2 video data at a rate depending on the type of the recording mode. The audio-video encoding and decoding unit 6 multiplexes the MPEG2 audio data and the MPEG2 video data to form multiplexed MPEG2 data. The audio-vide encoding and decoding unit 6 outputs the multiplexed MPEG2 data to the signal processor 5. The data rate of the compressively encoding process by the audio-video encoding and decoding unit 6, that is, the data transmission rate in the compressively encoding process, is equalized to a compression data rate which is selected from among plural different rates in accordance with the type of the recording mode of operation of the apparatus. During the compressively encoding process, the audio-video encoding and decoding unit 6 temporarily stores data in the memory 15.

It should be noted that the multiplexed MPEG2 data may be replaced by still-picture data or computer data such as program file data. In this case, the still-picture data or the computer data are transmitted to the system controller 9 via the interface 13. The system controller 9 transfers the still-picture data or the computer data to the signal processor 5.

During the recording mode of operation of the apparatus, the signal processor 5 adds error correction code signals (ECC signals or PI and PO signals) to the multiplexed MPEG2 data, the still-picture data, or the computer data. The signal processor 5 subjects the ECC-added data to NRZ and EFM+ encoding processes. The signal processor 5 adds a sync signal to the encoding-resultant data to form sync-added data. The sync signal is fed from the system controller 9. The sync-added data are temporarily stored in the track buffer memory 14. The sync-added data are read out from the track buffer memory 14 at a data rate corresponding to a data rate of signal recording on the optical disc 1. The signal processor 5 subjects the read-out data to given modulation for record. The signal processor 5 outputs the modulation-resultant signal to the amplifier unit 4. The amplifier unit 4 corrects the waveform of the output signal of the signal processor 5. The amplifier unit 4 outputs the waveform-correction-resultant signal to the laser drive circuit in the optical head 3. The optical head 3 records the output signal of the amplifier unit 4 on the target sector (the target track portion) on the optical disc 1.

The amplifier unit 4 informs the system controller 9 of detected jitter components. The system controller 9 subjects the detected jitter components to analog-to-digital conversion to generate a measured jitter value. During the recording mode of operation of the apparatus, the system controller 9 adjusts the degree or characteristic of the waveform correction by the amplifier unit 4 in response to the measured jitter value and an asymmetry value.

The optical disc 1 will be further described. Preferably, the optical disc 1 is based on a DVD-RW. In other words, the optical disc 1 is a modification of a DVD-RW. The optical disc 1 conforms to the standards of a recordable DVD. Regarding recorded contents, the optical disc 1 is compatible with a DVD-Video, a DVD-Audio, a DVD-ROM, a DVD of another type, or another high-density large-capacity optical disc. Addresses of sectors are previously recorded or formed on the DVD-RW. The recorded sector addresses enable address control to be implemented during the recording mode and the playback mode of operation of the apparatus. The optical disc 1 has a spiral groove corresponding to a spiral track. For example, the spiral groove is wobbled at a frequency modulated on the basis of data representing addresses, and hence the addresses are recorded on the optical disc 1 as a groove wobbling frequency signal. Preferably, the optical disc 1 has given pits (address pre-pits) which are previously formed in a land. The given pits are referred to as land pre-pits (LPP). The land pre-pits represent sector addresses which constitute a recording timing signal.

During the recording mode of operation of the apparatus, data are recorded on the optical disc 1. In general, the assignment of recorded data portions to sectors of the optical disc 1 is designed so that sector addresses (data addresses) in the recorded data portions will be in agreement with sector addresses (LPP addresses) represented by the land pre-pits. According to an example of data recording which provides agreement between data addresses and LPP addresses, data are reproduced from a DVD and are then recorded on a DVD-RW as they are. In this case, the data are continuously recorded on the DVD-RW so that data addresses and LPP addresses are in agreement with each other.

The recording mode of operation of the apparatus can be changed among different types including an RTR mode and a DVD-Video compatible mode. The user can select one of the RTR mode and the DVD-Video compatible mode by operating the key input unit 10 to generate a mode selection signal. The mode selection signal is transmitted from the key input unit 10 to the system controller 9. The system controller 9 changes the recording operation of the apparatus between the RTR mode and the DVD-Video compatible mode in response to the mode selection signal. Alternatively, the system controller 9 may change the recording operation of the apparatus between the RTR mode and the DVD-Video compatible mode in response to a type of an input signal to be recorded.

Figure 11:
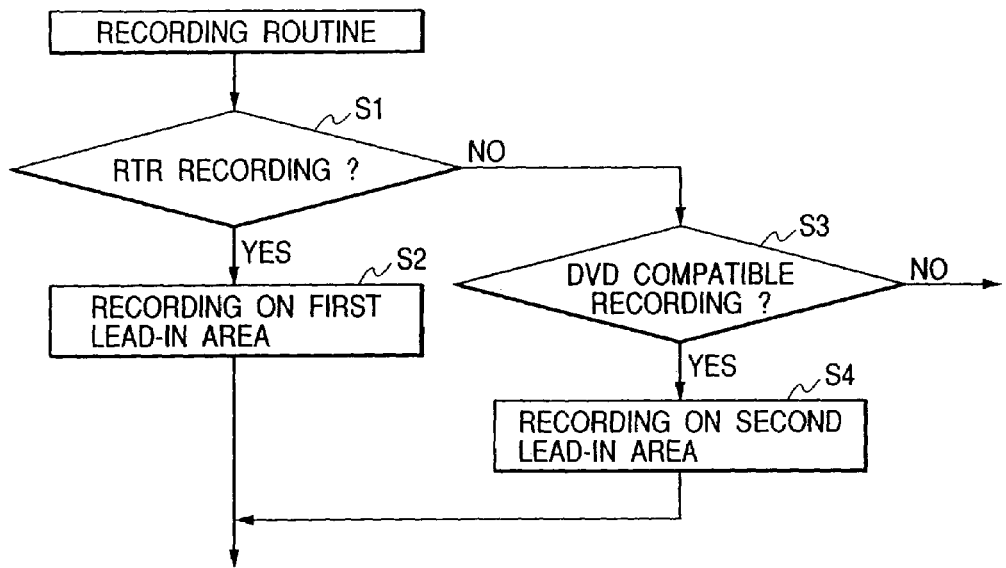
FIG. 11 is a flowchart of a portion of a program for a system controller in FIG. 10.

FIG. 11 shows a flowchart of a portion of a program for the system controller 9. The program portion in FIG. 11 relates to the recording mode of operation of the apparatus. As shown in FIG. 11, a step S1 of the program portion decides whether or not the RTR recording mode is selected by referring to the mode selection signal. When it is decided that the RTR recording mode is selected, the program advances from the step S1 to a step S2. On the other hand, when it is decided that the RTR recording mode is not selected, the program advances from the step S1 to a step S3.

The step S2 records contents information on the data area DA of an optical disc 1. In addition, the step S2 records lead-in information on the first lead-in area LI1 of the optical disc 1. The lead-in information contains CSS-key information. The lead-in information may be devoid of the CSS-key information.

The step S3 decides whether or not the DVD-Video-compatible recording mode is selected by referring to the mode selection signal. When it is decided that the DVD-Video-compatible recording mode is selected, the program advances from the step S3 to a step S4. On the other hand, when it is decided that the DVD-Video-compatible recording mode is not selected, the program advances from the step S3 to another step (not shown).

The step S4 records contents information on the data area DA of the optical disc 1. In addition, the step S4 records lead-in information on the second lead-in area LI2 except the pre-pit area PR of the optical disc 1. The recorded lead-in information is devoid of CSS-key information. The steps S2 and S4 are followed by a common step (not shown).

In the case where the pre-pit area PR has an 8-Kbyte size corresponding to 4 sectors, lead-in information of 24 Kbytes (=32 Kbytes−8 Kbytes) is recorded on the second lead-in area LI2 except the pre-pit area PR for one ECC block (32 Kbytes). On the other hand, in the case where the pre-pit area PR has a 32-Kbyte size, the recording of lead-in information on the second lead-in area LI2 is not executed for one ECC block.

During the RTR recording mode of operation of the apparatus, contents information and lead-in information are recorded on the optical disc 1 on a real-time basis. The after-recording optical disc 1 is incompatible with a DVD-Video.

During the DVD-Video-compatible recording mode of operation of the apparatus, it is difficult to record complicatedly-edited contents information on the optical disc 1 on a real-time basis. The after-recording optical disc 1 is compatible with a DVD-Video. Therefore, the after-recording optical disc 1 can be played back by a commercially-available DVD-Video player.

Figure 12:
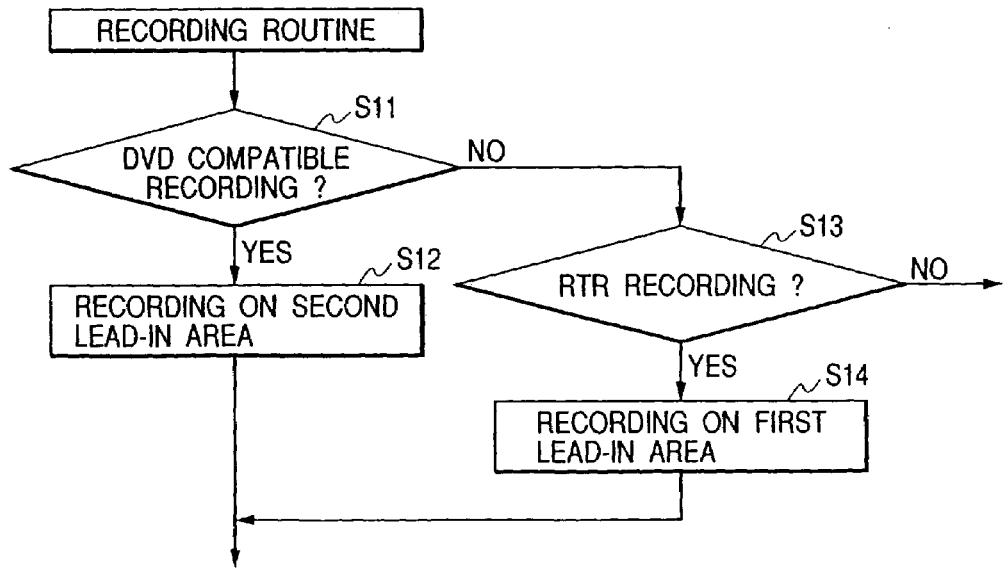
FIG. 12 is a flowchart of a portion of a program for the system controller in FIG. 10.

FIG. 12 shows a flowchart of a portion of a program for the system controller 9. The program portion in FIG. 12 may replace the program portion in FIG. 11. As shown in FIG. 12, a step S11 of the program portion decides whether or not the DVD-Video-compatible recording mode is selected by referring to the mode selection signal. When it is decided that the DVD-Video-compatible recording mode is selected, the program advances from the step S11 to a step S12. On the other hand, when it is decided that the DVD-Video-compatible recording mode is not selected, the program advances from the step S11 to a step S13.

The step S12 records contents information on the data area DA of an optical disc 1. In addition, the step S12 records lead-in information on the second lead-in area LI2 except the pre-pit area PR of the optical disc 1. The recorded lead-in information is devoid of CSS-key information.

The step S13 decides whether or not the RTR recording mode is selected by referring to the mode selection signal. When it is decided that the RTR recording mode is selected, the program advances from the step S13 to a step S14. On the other hand, when it is decided that the RTR recording mode is not selected, the program advances from the step S13 to another step (not shown).

The step S14 records contents information on the data area DA of the optical disc 1. In addition, the step S14 records lead-in information on the first lead-in area LI1 of the optical disc 1. The lead-in information contains CSS-key information. The lead-in information may be devoid of the CSS-key information. The steps S12 and S14 are followed by a common step (not shown).

An optical disc 1 played back by the apparatus can be changed among DVD information recording media including a DVD-Video, a DVD-RW version "1.0", and a DVD-RW in the first embodiment of this invention. As viewed at physical radial positions in FIG. 1, the DVD-Video does not have a first lead-in area LI. The DVD-Video has a second lead-in area LI2 which stores lead-in information containing CSS-key information. The DVD-RW version "1.0" has a first lead-in area LI1. The DVD-RW version "1.0" also has an unreadable lead-in area positionally corresponding to a second lead-in area LI2. The DVD-RW in the first embodiment of this invention has a first lead-in area LI1 and a second lead-in area LI2 which are readable. In the DVD-RW of the first embodiment of this invention, the first lead-in area LI1 stores first lead-in information, and the second lead-in area LI2 stores second lead-in information containing copyright-protection-related information such as information of a CSS key corresponding to a given value.

Figure 13:
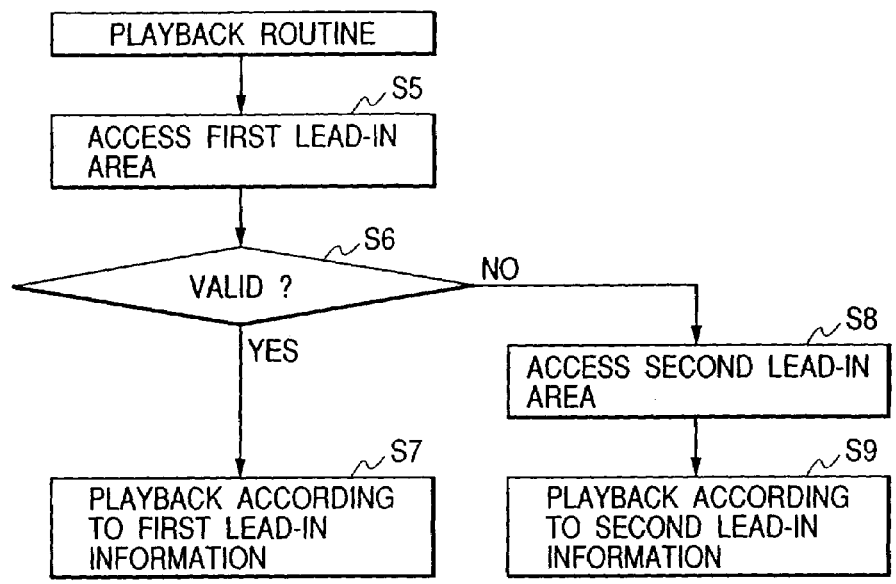
FIG. 13 is a flowchart of a portion of a program for the system controller in FIG. 10.

FIG. 13 shows a flowchart of a portion of the program for the system controller 9. The program portion in FIG. 13 relates to the playback mode of operation of the apparatus. As shown in FIG. 13, a step S5 of the program portion accesses lead-in information on the first lead-in area LI1 of an optical disc 1.

A step S6 following the step S5 decides whether or not the lead-in information is valid as a media type by referring to flag information in the lead-in information. When it is decided that the lead-in information is valid, the program advances from the step S6 to a step S7. On the other hand, when it is decided that the lead-in information is not valid, the program advances from the step S6 to a step S8. Also, when it is found that the lead-in information is absent from the first lead-in area LI1, the program advances from the step S6 to the step S8.

The step S7 reproduces the lead-in information from the first lead-in area LI1 of the optical disc 1. The reproduced lead-in information contains CSS-key information. The reproduced lead-in information may be devoid of the CSS-key information. In addition, the step S7 reproduces contents information from the data area DA of the optical disc 1 in accordance with the reproduced lead-in information. The reproduction of the contents information is implemented in, for example, an RTR playback mode.

The step S8 accesses lead-in information on the second lead-in area LI2 of the optical disc 1. The step S8 decides whether or not the lead-in information is valid as a media type by referring to flag information in the lead-in information. When it is decided that the lead-in information is valid, the program advances from the step S8 to a step S9. On the other hand, when it is decided that the lead-in information is not valid, the current execution cycle of the program portion ends.

The step S9 reproduces the lead-in information from the second lead-in area LI2 of the optical disc 1. The reproduced lead-in information contains CSS-key information. In addition, the step S9 reproduces contents information from the data area DA of the optical disc 1 in accordance with the reproduced lead-in information. The reproduction of the contents information is implemented in, for example, a DVD-Video-compatible playback mode. The step S9 may stop the reproduction of the contents information when the reproduced lead-in information and the apparatus are in a predetermined unacceptable relation.

Figure 14:
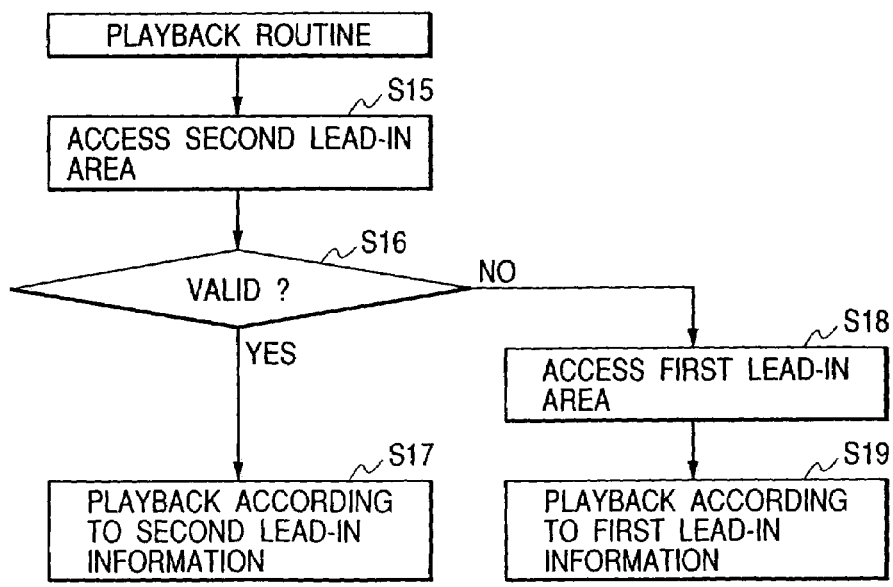
FIG. 14 is a flowchart of a portion of a program for the system controller in FIG. 10.

FIG. 14 shows a flowchart of a portion of a program for the system controller 9. The program portion in FIG. 14 may replace the program portion in FIG. 13. As shown in FIG. 14, a step S15 of the program portion accesses lead-in information on the second lead-in area LI2 of an optical disc 1.

A step S16 following the step S15 decides whether or not the lead-in information is valid as a media type by referring to flag information in the lead-in information. When it is decided that the lead-in information is valid, the program advances from the step S16 to a step S17. On the other hand, when it is decided that the lead-in information is not valid, the program advances from the step S16 to a step S18.

The step S17 reproduces the lead-in information from the second lead-in area LI2 of the optical disc 1. The reproduced lead-in information contains CSS-key information. In addition, the step S17 reproduces contents information from the data area DA of the optical disc 1 in accordance with the reproduced lead-in information. The reproduction of the contents information is implemented in, for example, a DVD-Video-compatible playback mode.

The step S18 accesses lead-in information on the first lead-in area LI of the optical disc 1. The step S18 decides whether or not the lead-in information is valid as a media type by referring to flag information in the lead-in information. When it is decided that the lead-in information is valid, the program advances from the step S18 to a step S19. On the other hand, when it is decided that the lead-in information is not valid, the current execution cycle of the program portion ends. Also, when it is found that the lead-in information is absent from the first lead-in area LI1, the current execution cycle of the program portion ends.

The step S19 reproduces the lead-in information from the first lead-in area LI1 of the optical disc 1. The reproduced lead-in information contains CSS-key information. The reproduced lead-in information may be devoid of the CSS-key information. In addition, the step S19 reproduces contents information from the data area DA of the optical disc 1 in accordance with the reproduced lead-in information. The reproduction of the contents information is implemented in, for example, an RTR playback mode. The step S19 may stop the reproduction of the contents information when the reproduced lead-in information and the apparatus are in a predetermined unacceptable relation.

In the information recording medium, 16 successive data sectors (32 Kbytes) compose one ECC block which is a minimum unit of recording and reproducing data. Each data sector is composed of 26 sync frames to which sync signals are added (see FIG. 4). The sync frames are synchronized with a sync timing signal for recording, and with LPP addresses. The DVD-RW has the additional feature that land pre-pits representing sector addresses are formed at given intervals along a track.

As previously mentioned, the second lead-in area LI2 of the information recording medium or the DVD-RW contains the pre-pit area PR which stores the copyright-protection-related information (the CSS-key information or the copy guard information). According to a first example, the pre-pit area PR occupies only 4 sectors in one ECC block. According to a second example, the pre-pit area PR fully occupies 16 sectors in one ECC block.

Figure 15:
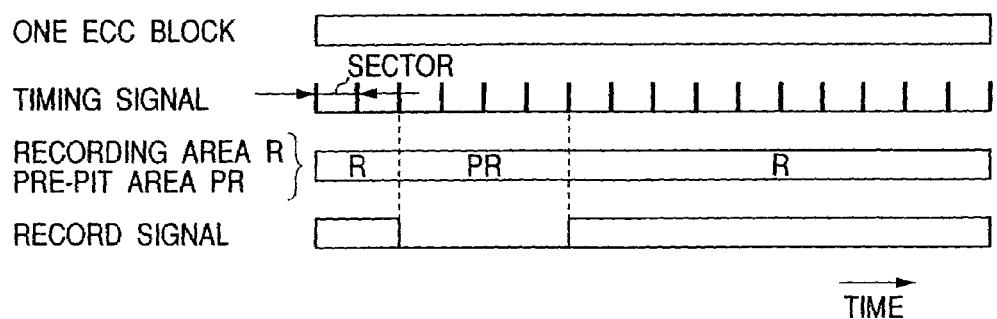
FIG. 15 is a diagram of the relation among one ECC block, a timing signal, a pre-pit area, and a recorded signal.

In the case where the pre-pit area PR occupies only 4 sectors in one ECC block, the recording of data on the ECC block is implemented as follows. The ROM within the system controller 9 stores the copyright-protection-related information same as that recorded on the pre-pit area PR of the information recording medium. The system controller 9 reads out the copyright-protection-related information from the ROM. The system controller 9 uses the track buffer memory 14 via the signal processor 5, and thereby combines the copyright-protection-related information with data to be recorded on the ECC block. The combining-resultant data are processed into ECC-signal-added data (PI/PO-signal-added data) for the ECC block. The ECC-signal-added data for the ECC block are referred to as the 1-ECC-block data. With reference to FIG. 15, a first portion of the 1-ECC-block data is recorded while the LPP-based recording timing signal is used as reference timings indicative of the boundaries between sectors or the heads of sectors. The first portion extends from the head of the 1-ECC-block data to a point corresponding to the starting edge of the pre-pit area PR. At the timing corresponding to the starting edge of the pre-pit area PR and given by the LPP-based recording timing signal, the system controller 9 suspends the recording and changes the operation of the apparatus from the recording mode to the playback mode. The recording continues to be suspended until the timing corresponding to the ending edge of the pre-pit area PR and given by the LPP-based recording timing signal. As a result, a second portion of the 1-ECC-block data which follows the first portion thereof is not recorded on the pre-pit area PR. Thus, the original copyright-protection-related information recorded on the pre-pit area PR is prevented from being damaged and contaminated by the phase change overwrite. At the timing corresponding to the ending edge of the pre-pit area P, the system controller 9 returns the operation of the apparatus to the recording mode and restarts the recording. Therefore, a third portion of the 1-ECC-block data is recorded while the LPP-based recording timing signal is used as reference timings indicative of the boundaries between sectors or the heads of sectors. The third portion extends between a point corresponding to the ending edge of the pre-pit area PR and the end of the 1-ECC-block data.

Figure 16:
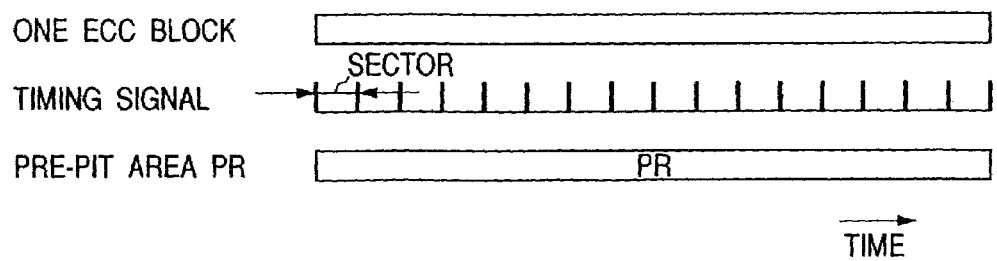
FIG. 16 is a diagram of the relation among one ECC block, a timing signal, and a pre-pit area.

In the case where the pre-pit area PR fully occupies 16 sectors in one ECC block, the recording of data on the ECC block is not executed as shown in FIG. 16.

During the playback of the information recording medium (the DVD-RW) by a DVD-Video player, lead-in information is reproduced from the second lead-in area LI2 of the information recording medium. The reproduced lead-in information contains CSS-key information. Then, contents information is reproduced from the data area DA of the information recording medium in response to the reproduced lead-in information. The reproduction of the contents information may be stopped when the reproduced lead-in information and the player are in a predetermined unacceptable relation.

During the playback of the information recording medium (the DVD-RW) by the apparatus in the second embodiment of this invention, first lead-in information is reproduced from the first lead-in area LI1 of the information recording medium. In the case where the first lead-in information is absent from the first lead-in area LI1 or flag information in the first lead-in information indicates that the first lead-in information is invalid, second lead-in information is reproduced from the second lead-in area of the information recording medium. In the case where the second lead-in information is required, the second lead-in information is reproduced from the second lead-in area of the information recording medium. The second lead-in information contains copyright-protection-related information. Contents information is reproduced from the data area DA of the information recording medium in response to the reproduced second lead-in information. On the other hand, in the case where the flag information in the first lead-in information indicates that the first lead-in information is valid, the contents information is reproduced from the data area DA of the information recording medium in response to the reproduced first lead-in information.

When the pre-pit area PR occupies only 4 sectors in one ECC block (see FIG. 15), the recorded data on the ECC block has two linkings or seams. During playback, the error correction process is able to successfully correct data errors which might be caused by the linkings since the number of the data errors is within the range of the ability to correct errors. Thus, the original copyright-protection-related information can be stably and accurately reproduced.

It is assumed that the information-recording medium (the DVD-RW) stores given CSS-key information in its pre-pit area PR, and contents information scrambled according to a CSS is illegally recorded and copied on the data area DA of the information recording medium. Usually, CSS-key information corresponding to the illegally-recorded contents information is different from the given CSS-key information so that the illegally-copied contents information can not be descrambled during playback. Thus, the illegally-copied contents information can not be reproduced by a player such as a DVD-Video player. On the other hand, after unscrambled contents information (for example, personal contents information) is recorded on the data area DA of the information recording medium, the contents information can be reproduced from the information recording medium by a DVD-Video player.

Other Embodiments

The DVD-Video in the first and second embodiments of this invention may be replaced by a DVD-Audio. The DVD in the first and second embodiments of this invention may be replaced by another high-density large-capacity recording medium.

What is claimed is:

1. An information recording medium on and from which information can be recorded and reproduced, the information recording medium having:
    a lead-in area;
    a first lead-in information area located in the lead-in area;
    a second lead-in information area located in the lead-in area; and
    a data area for storing data;
    wherein information is recorded on the first lead-in information area in an error correction block unit, and the first lead-in information area is for storing lead-in information relating to the data area;
    wherein an error correcting ability in the error correction block unit corresponds to an information amount of n bytes; and
    wherein the second lead-in information area includes a pre-pit area having information whose amount is greater than at least n bytes in the error correction block unit, and the second lead-in information area is an area for storing lead-in information relating to the data area.

2. A method of reproducing information from an information recording medium on and from which information can be recorded and reproduced, the information recording medium having a lead-in area; a first lead-in information area located in the lead-in area; a second lead-in information area located in the lead-in area; and a data area for storing data; wherein information is recorded on the first lead-in information area in an error correction block unit, and the first lead-in information area is for storing lead-in information relating to the data area; wherein an error correcting ability in the error correction block unit corresponds to an information amount of n bytes; and wherein the second lead-in information area includes a pre-pit area having information whose amount is greater than at least n bytes in the error correction block unit, and the second lead-in information area is an area for storing lead-in information relating to the data area, the method comprising the steps of:
    accessing information stored in the first lead-in information area or the second lead-in information area; and
    reproducing data from the data area in the error correction block unit in response to the accessed information.

3. A method of recording information on an information recording medium on and from which information can be recorded and reproduced, the information recording medium having a lead-in area; a first lead-in information area located in the lead-in area; a second lead-in information area located in the lead-in area; and a data area for storing data; wherein information is recorded on the first lead-in information area in an error correction block unit, and the first lead-in information area is for storing lead-in information relating to the data area; wherein an error correcting ability in the error correction block unit corresponds to an information amount of n bytes; and wherein the second lead-in information area includes a pre-pit area having information whose amount is greater than at least n bytes in the error correction block unit, and the second lead-in information area is an area for storing lead-in information relating to the data area, the method comprising the steps of:

generating data to be recorded as error correction block information;

getting an address of a usable area on and from which information can be recorded and reproduced, and which includes the pre-pit area; and recording the error correction block information on an error correction block in the usable area except the pre-pit area in response to the address of the usable area.

4. An information recording medium on and from which information can be recorded and reproduced, the information recording medium having:

a lead-in area;

a first lead-in information area located in the lead-in area;

a second lead-in information area located in the lead-in area; and a data area for storing data;

wherein the first lead-in information area is for storing lead-in information relating to the data area; and wherein the second lead-in information area includes an area having a physical characteristic as information whose amount is greater than at least n bytes in a prescribed data unit, and the second lead-in information area is an area for storing lead-in information relating to the data area.

5. A method of reproducing information from an information recording medium on and from which information can be recorded and reproduced, the information recording medium having a lead-in area; a first lead-in information area located in the lead-in area; a second lead-in information area located in the lead-in area; and a data area for storing data; wherein the first lead-in information area is for storing lead-in information relating to the data area; and wherein the second lead-in information area includes an area having a physical characteristic as information whose amount is greater than at least n bytes in a prescribed data unit, and the second lead-in information area is an area for storing lead-in information relating to the data area, the method comprising the steps of:

accessing information stored in the first lead-in information area or the second lead-in information area; and reproducing data from the data area in response to the accessed information.

6. A method of recording information on an information recording medium on and from which information can be recorded and reproduced, the information recording medium having a lead-in area; a first lead-in information area located in the lead-in area; a second lead-in information area located in the lead-in area; and a data area for storing data; wherein the first lead-in information area is for storing lead-in information relating to the data area; and wherein the second lead-in information area includes an area having a physical characteristic as information whose amount is greater than at least n bytes in a prescribed data unit, and the second lead-in information area is an area for storing lead-in information relating to the data area, the method comprising the steps of:

generating data to be recorded;

getting an address of a usable area on and from which information can be recorded and reproduced, and which includes the area having the physical characteristic; and recording the generated data on the usable area except the area having the physical characteristic in response to the address of the usable area.

* * * * *